US012757305B2

(12) United States Patent
Green et al.

(10) Patent No.: US 12,757,305 B2
(45) Date of Patent: Oct. 6, 2026

(54) COMMUNICATION LINK FOR A LIGHTING CONTROL SYSTEM

(71) Applicant: Lutron Technology Company LLC, Coopersburg, PA (US)

(72) Inventors: Christopher M. Green, Austin, TX (US); Ananthanag Nemmani, Austin, TX (US); Jaykrishna A. Shukla, Mays Landing, NJ (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 19/067,101

(22) Filed: Feb. 28, 2025

(65) Prior Publication Data

US 2025/0275042 A1 Aug. 28, 2025

Related U.S. Application Data

(60) Provisional application No. 63/559,082, filed on Feb. 28, 2024.

(51) Int. Cl.
*H05B 47/18* (2020.01)

(52) U.S. Cl.
CPC .................................... *H05B 47/18* (2020.01)

(58) Field of Classification Search
CPC .. H05B 45/3725; H05B 47/115; H05B 47/16; H05B 47/17; H05B 47/175; H05B 45/10; H05B 45/12; H05B 47/11; H05B 47/13; H05B 47/18; H05B 47/19; H05B 45/20; H05B 45/56; H05B 45/24; H05B 45/37; H05B 45/44; H05B 47/1965; H05B 47/199; H05B 47/10; H05B 39/08; H05B 47/185
See application file for complete search history.

(56) References Cited

U.S. PATENT DOCUMENTS

| | | | |
|---|---|---|---|
| 7,787,485 B2 | 8/2010 | Howe et al. | |
| 7,872,429 B2 | 1/2011 | Steiner et al. | |
| 8,306,051 B2 * | 11/2012 | Stocker .................. | H05B 47/18 370/449 |
| 9,345,097 B1 | 5/2016 | Ho et al. | |
| 9,578,724 B1 | 2/2017 | Knapp et al. | |
| 9,681,513 B2 | 6/2017 | Dadashnialehi et al. | |
| 9,699,863 B2 | 7/2017 | Weightman et al. | |
| 9,736,911 B2 | 8/2017 | Taipale et al. | |
| 10,299,356 B1 | 5/2019 | Quilling et al. | |

(Continued)

*Primary Examiner* — Monica C King
(74) *Attorney, Agent, or Firm* — Flaster Greenberg PC

(57) ABSTRACT

A light-generation module of a lighting device may be configured to receive a bus voltage and a control signal from a power supply via a three-wire bus. The power supply may be configured to generate the bus voltage from an alternating-current (AC) mains line voltage. The light-generation module may comprise first and second electrical connections configured to receive the bus voltage from the power supply, and a third electrical connection configured to receive a control signal from the power supply. The control circuit may be configured to detect a synchronization pulse in a control signal during a synchronization window in each line-cycle of the AC mains line voltage, control the at least one emitter in response to the synchronization pulses, and control the control signal at the third electrical connection to transmit data to the power supply by generating a communication pulse in the control signal.

20 Claims, 12 Drawing Sheets

(56) References Cited

U.S. PATENT DOCUMENTS

| | | | | |
|---|---|---|---|---|
| 11,304,284 | B2 | 4/2022 | Knauss et al. | |
| 11,570,874 | B2 | 1/2023 | Bocock et al. | |
| 11,743,985 | B2 | 8/2023 | Green et al. | |
| 11,859,803 | B2 | 1/2024 | Bocock et al. | |
| 2015/0327340 | A1 | 11/2015 | Siessegger et al. | |
| 2019/0215927 | A1 | 7/2019 | Sooch et al. | |
| 2024/0102632 | A1 | 3/2024 | Dong et al. | |
| 2024/0196501 | A1 * | 6/2024 | Woytowitz ............. | H05B 45/20 |
| 2024/0206042 | A1 | 6/2024 | Bocock et al. | |

* cited by examiner

COMMUNICATION LINK FOR A LIGHTING CONTROL SYSTEM

CROSS-REFERENCE TO RELATED APPLICATIONS

This application claims priority from Provisional U.S. Patent Application No. 63/559,082, filed Feb. 28, 2024, the entire disclosure of which is hereby incorporated by reference herein in its entirety.

BACKGROUND

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, a light-generation module of a lighting device may be configured to receive a bus voltage and a control signal from a power supply via a three-wire bus. The power supply may be configured to generate the bus voltage from an alternating-current (AC) mains line voltage. The light-generation module may comprise first and second electrical connections configured to receive the bus voltage from the power supply, and a third electrical connection configured to receive a control signal from the power supply. The light-generation module may also comprise at least one emitter configured to emit light, a drive circuit configured to receive the bus voltage and control an amount of current conducted by the at least one emitter, and a control circuit configured to control the drive circuit to adjust the amount of current conducted by the at least one emitter to adjust an amount of light emitted by the light-generation module. The control circuit may be configured to detect a synchronization pulse in the control signal during a synchronization window in each line-cycle of the AC mains line voltage, and control the at least one emitter in response to the synchronization pulses. The control circuit may be configured to control the control signal at the third electrical connection to transmit data to the power supply by generating a communication pulse in the control signal. The control circuit may be configured to set a time length of the communication pulse based on the data.

DETAILED DESCRIPTION

Figure 1:
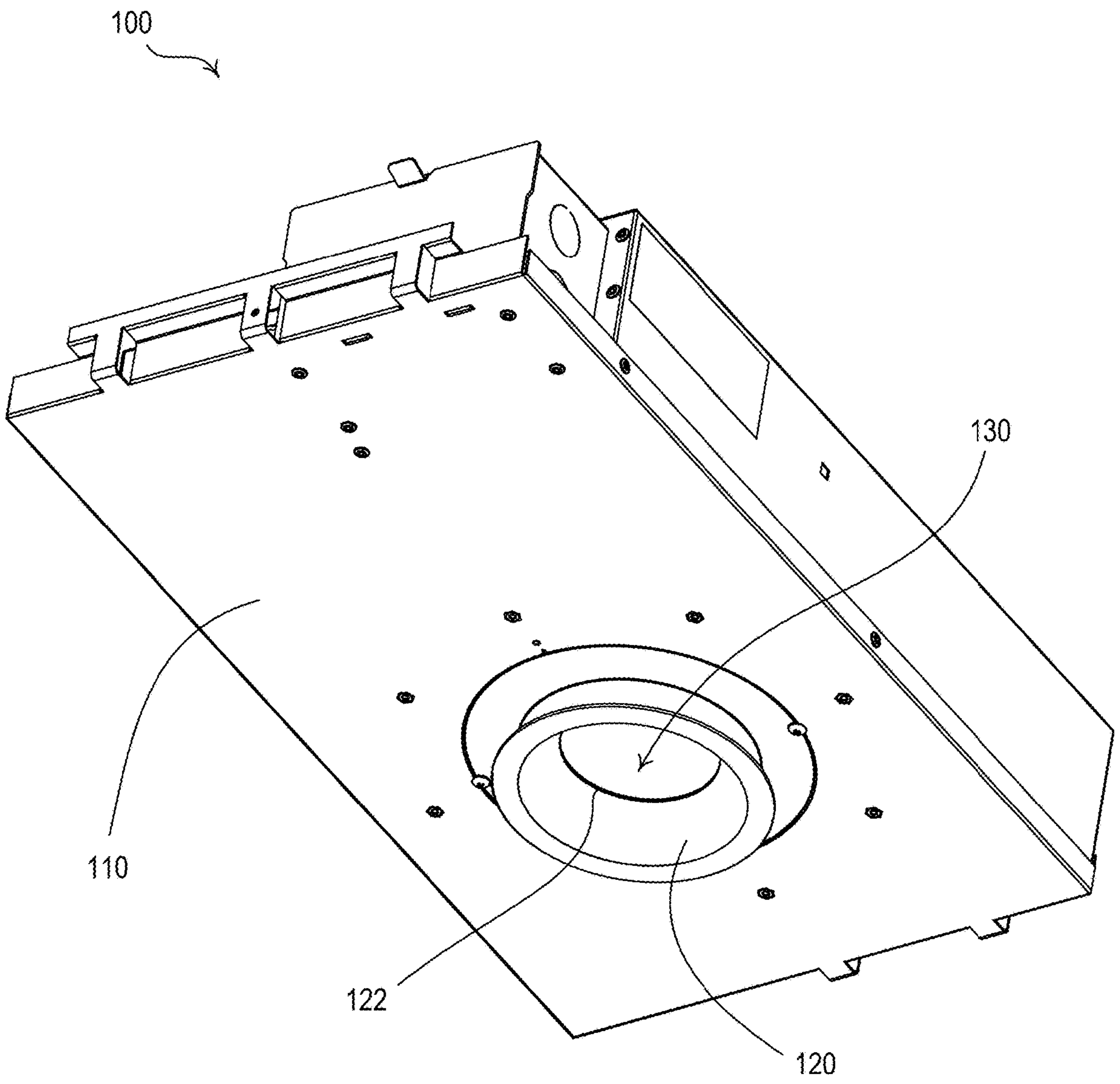
FIG. 1 is a perspective view of an example lighting device.

FIG. 1 is a perspective view of an example illumination device, such as a lighting device 100 (e.g., a downlight fixture). The lighting device 100 may include a housing 110 (e.g., an enclosure), a trim 120, and a lighting device assembly 130. The housing 110 may be configured to enclose the lighting device assembly 130, and at least a portion of the trim 120. The housing 110 may be configured to be installed within a structure (e.g., a ceiling). When the housing 110 is installed within the structure, at least a portion of the trim 120 may extend from the structure. The trim 120 may be configured to cover (e.g., hide from view) an opening in the housing 110. The housing 110 may be configured to receive various trims (e.g., such as the trim 120) with varying physical properties. The trim 120 may define an aperture 122 of the lighting device 100 through which the lighting device assembly 130 may be configured to emit light.

Figure 2A:
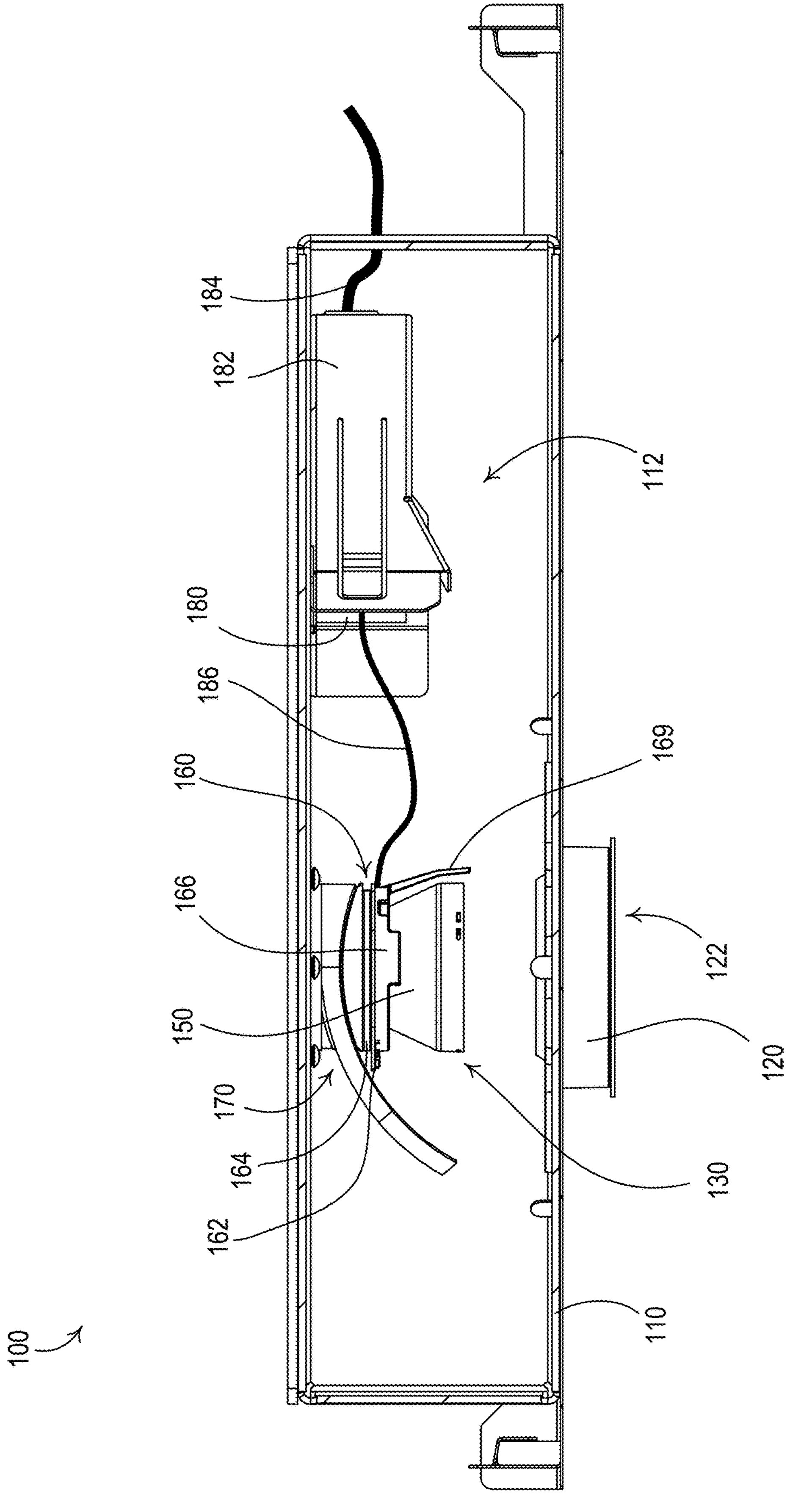
FIG. 2A is a side cross-section view of the lighting device of FIG. 1 when a lighting device assembly of the lighting device is in a centered position.
Figure 2B:
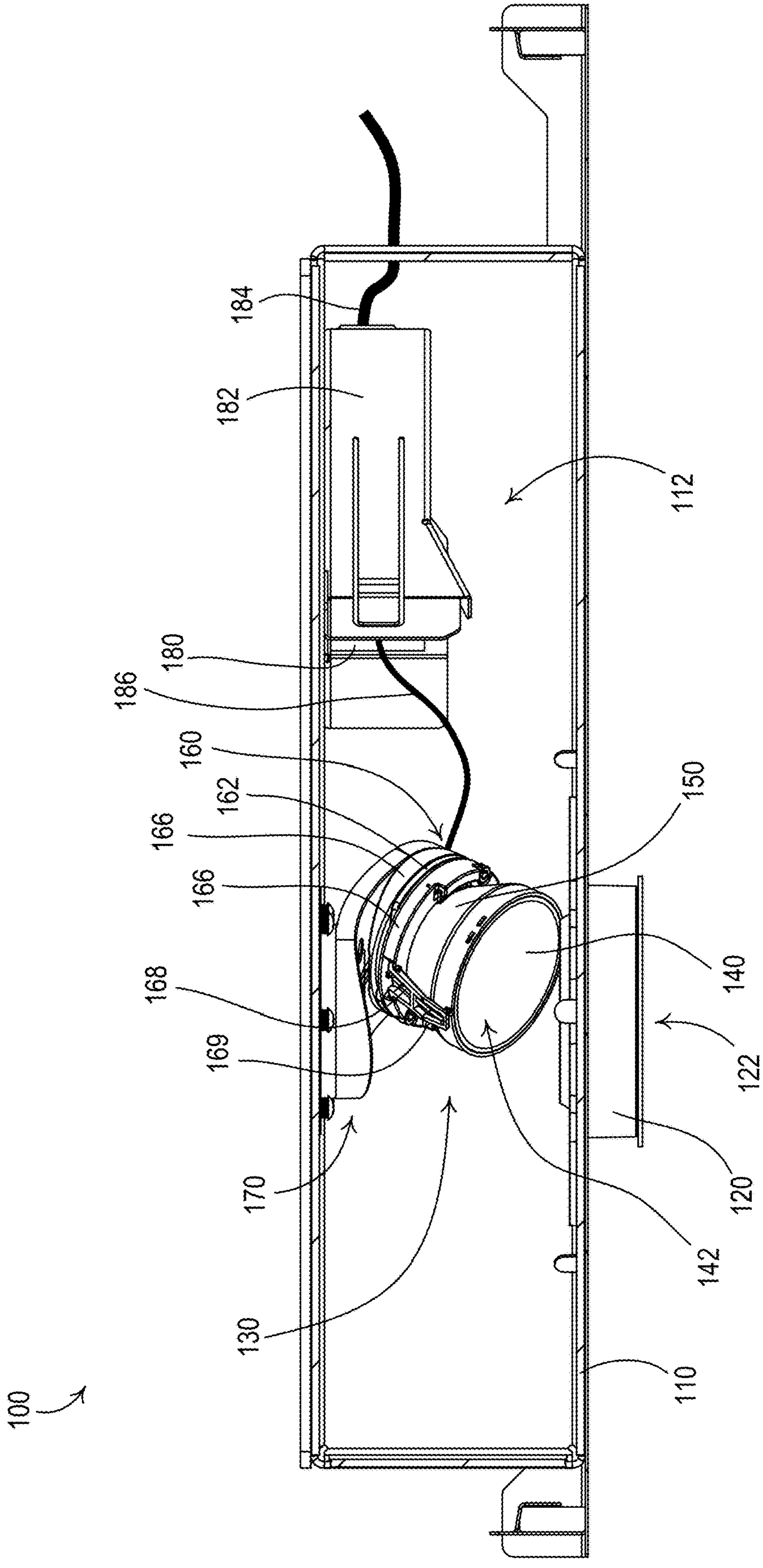
FIG. 2B is a side cross-section view of the lighting device of FIG. 1 when the lighting device assembly is in an adjusted position (e.g., tilted and/or rotated).

FIG. 2A is a side cross-section view of the lighting device 100 when the lighting device assembly 130 is in a centered position. FIG. 2B is a side cross-section view of the lighting device 100 when the lighting device assembly 130 is in an adjusted position (e.g., tilted and rotated). The housing 110 may be configured to enclose the lighting device assembly 130. For example, the housing 110 may define a cavity 112. The lighting device assembly 130 may comprise an optical structure 140 (e.g., a lens), a reflector 150, and a light-generation module 160. The lighting device 100 (e.g., the light-generation module 160) may be configured to be wirelessly controllable (e.g., controlled in response to commands received via wireless signals). The light-generation module 160 of the lighting device assembly 200 may be configured to emit light and communicate messages (e.g., digital messages) via wireless signals. The light-generation module 160 may comprise a printed circuit board 162, a heat sink 164, a socket 166, an antenna 168 (e.g., a monopole antenna), and an antenna holder 169. The light-generation module 160 may include an emitter assembly (e.g., such as emitter assembly 240 shown in FIG. 4 and/or emitter assembly 300 shown in FIGS. 5 and 6) that includes one or more emitters configured to emit the light. The emitter assembly may be mounted to the printed circuit board 162. The light-generation module 160 may include a communication circuit, e.g., a wireless communication circuit (e.g., such as communication circuit 444 shown in FIG. 8), which may be mounted to the printed circuit board 162 and may be in electrical communication with (e.g., electrically coupled to) the antenna 168 for receiving and/or sending messages via the wireless signals.

The lens 140 of the lighting device assembly 130 may be transparent or translucent, and may be made of any suitable material, for example plastic or glass. The lens 140 may be configured to direct the light emitted by the emitter assembly to shine through a light-exit surface 142 of the lens 140. The reflector 150 of the lighting device assembly 130 may be configured to direct the light emitted by the emitter assembly to shine out through the lens 140. For example, the reflector 150 may be at least partially metallic and many have an inner surface that includes a reflective material. The antenna holder 169 may be configured to hold the antenna 168 such that the antenna 168 is spaced a predetermined distance from the reflector 150. The socket 166 of the light-generation module 160 may be located between the reflector 150 and the printed circuit board 168. For example, the socket 166 may be attached to the heat sink 164 to at least partially enclose the components mounted to the printed circuit board 163. The antenna holder 169 may extend from the socket 166 and/or the printed circuit board 162. The socket 150 of the light-generation module 160 may be configured to removably secure the reflector 150 to the light-generation module 160.

The lighting device 100 may comprise an armature 170 of the lighting device 100 to which the lighting device assembly 130 may be mounted. The armature 170 may be attached to the housing 110. The armature 170 may be configured to support the lighting device assembly 130 within the housing 110 above the aperture 122 in the trim 120, for example, such that the light emitted by the light-generation module 160 may shine through the aperture 122 of the trim 120. In some examples, the armature 170 may be configured to enable tilting and rotation of the lighting device assembly 130 within the housing 110 such that the light emitted by the light-generation module 160 is directed through the trim 120 (e.g., the aperture 122) at a plurality of angles and directions. The armature 170 may enable the lighting device assembly 130 to be adjusted among the centered position and a plurality of adjusted positions. For example, the lighting device assembly 130 (e.g., the armature 170) may be in a centered position when the light-generation module 160 is pointed straight down (e.g., as shown in FIG. 2A). In addition, the lighting device assembly 130 (e.g., the armature 170) may be in an adjusted position when the armature 170 is tilted and/or rotated (e.g., as shown in FIG. 2B). In some examples, the lighting device 100 may not comprise the armature 170 and the lighting device assembly 130 may be mounted in a stationary position (e.g., with the light-generation module 160 directed straight down as shown in FIG. 2A).

The lighting device 100 may further comprise a power supply 180. The power supply 180 may be housed in a power supply enclosure 182 mounted within the cavity 112 of the housing 110. The power supply 180 may be coupled to a power source, such as an alternating-current (AC) power source, via a first cable 184 for receiving an AC mains line voltage. The power supply 180 may be coupled to the light-generation module 160 of the lighting device assembly 130 via a second cable 186. The power supply 180 may be configured to generate a direct-current (DC) bus voltage from the AC mains line voltage. The DC bus voltage may be coupled to the light-generation module 160 via the second cable 186 for powering the light-generation module 160 from the DC bus voltage. For example, the second cable 186 may comprise three electrical conductors (e.g., wires). The second cable 186 may comprise two electrical conductors for coupling the DC bus voltage from the power supply 180 to the light-generation module 160 (e.g., one of the two electrical conductors may be coupled to a circuit common of the power supply 180). In addition, the second cable 186 may comprise a third electrical conductor (e.g., a signal line) to allow for communication between the power supply 180 and the light-generation module 160.

The power supply 180 may be configured to generate a control signal that may be coupled to the light-generation module 160 via the signal line of the second cable 186. The power supply 180 may be configured to generate the control signal in response to the AC mains line voltage, such that the control signal may indicate zero-crossings of the AC mains line voltage. The power supply 180 may be configured to generate a synchronization pulse in the control signal to indicate a time of a zero-crossing of the AC mains line voltage. For example, a falling edge of the synchronization pulse may indicate the time of the zero-crossing of the AC mains line voltage. The power supply 180 may generate the synchronization pulse in the control signal, for example, once every line-cycle of the AC mains line voltage (e.g., at the positive-going zero-crossings at the start of each positive half-cycle). The light-generation module 160 may be configured to monitor the control signal to detect the synchronization pulse during a synchronization window (e.g., a periodic synchronization window) in each line-cycle of AC mains line voltage. The light-generation module 160 may be configured to control the emitter assembly of the light-generation module 160 to cause the lighting device assembly 130 to emit light in response to the synchronization pulses of the control signal. Use of the control signal may allow for the coordination (e.g., synchronization) of multiple lighting devices (e.g., such as multiple installations of the lighting device 100) generating light in the same space.

The power supply 180 may be configured to transmit data to the light-generation module 160 via the signal line of the second cable 186. In some examples, the power supply 180 may be configured to transmit the data to the light-generation module 160 as part of the generation of the synchronization pulses of the control signal, e.g., during the synchronization window of each line-cycle of AC mains line voltage. For example, the power supply 180 may be configured to modulate a time length $T_{DATA1}$ (e.g., duration) of the synchronization pulse to transmit the data. The data may be, for example, a function of the time length $T_{DATA1}$ of the synchronization pulse. For example, the power supply 180 may be configured to transmit an indication of a magnitude of the AC mains lines voltage to the light-generation module 160. The light-generation module 160 may be configured to control the emitter assembly of the light-generation module 160 to cause the lighting device assembly 130 to emit light in response to the magnitude of the AC mains line voltage. For example, the light-generation module 160 may be configured to foldback (e.g., reduce) the intensity level of the light emitted by the light-generation module 160 when the magnitude of the AC mains line voltage is less than (e.g., less than or equal to) a first threshold, and/or stop emitting light when the magnitude of the AC mains line voltage is less than (e.g., less than or equal to) a second threshold (e.g., which may be less than the first threshold).

The light-generation module 160 may be configured to transmit data to the power supply 180 via the signal line of the second cable 186. For example, the light-generation module 160 may be configured to transmit the data during a communication window (e.g., a periodic communication window) in each line-cycle of the AC mains line voltage. The communication window may be located outside of the synchronization window during each line-cycle (e.g., the communication window does not overlap with the synchronization window). For example, the light-generation module 160 may be configured to transmit the data to the power supply 180 by generating a communication pulse in the control signal on the signal line during the communication window. In some examples, the light-generation module 160 may be configured to generate, for example, a single communication pulse in the control signal during each communication window (e.g., during each line-cycle). For example, the light-generation module 160 may be configured to modulate a time length $T_{DATA2}$ of the communication pulse to transmit the data. The data may be, for example, a function of the time length $T_{DATA2}$ of the communication pulse. For example, the light-generation module 160 may be configured to transmit an indication of the magnitude of the bus voltage received from the power supply 180 via the second cable 186 to the power supply 180 (e.g., based on the time length $T_{DATA2}$ of the communication pulse). In addition, the light-generation module 160 may be configured to transmit an indication of an amount of power to be drawn from the power supply 180 in the future, e.g., during a subsequent line-cycle of the AC mains line voltage (e.g., during the next line-cycle). For example, the light-generation module 160 may be configured to transmit an indication of an actual amount of power to be drawn from the power supply 180 during the subsequent line-cycle of the AC mains line voltage and/or an indication of an amount of a change in the amount of power to be drawn from the power supply 180 during the subsequent line-cycle of the AC mains line voltage (e.g., based on the time length $T_{DATA2}$ of the communication pulse). The power supply 180 may be configured to control the generation of the DC bus voltage in response to the indication of the magnitude of the bus voltage and/or the indication of the amount of power to be drawn from the power supply 180 during the subsequent line-cycle (e.g., as indicated by the time length $T_{DATA2}$ of the communication pulse).

Figure 3:
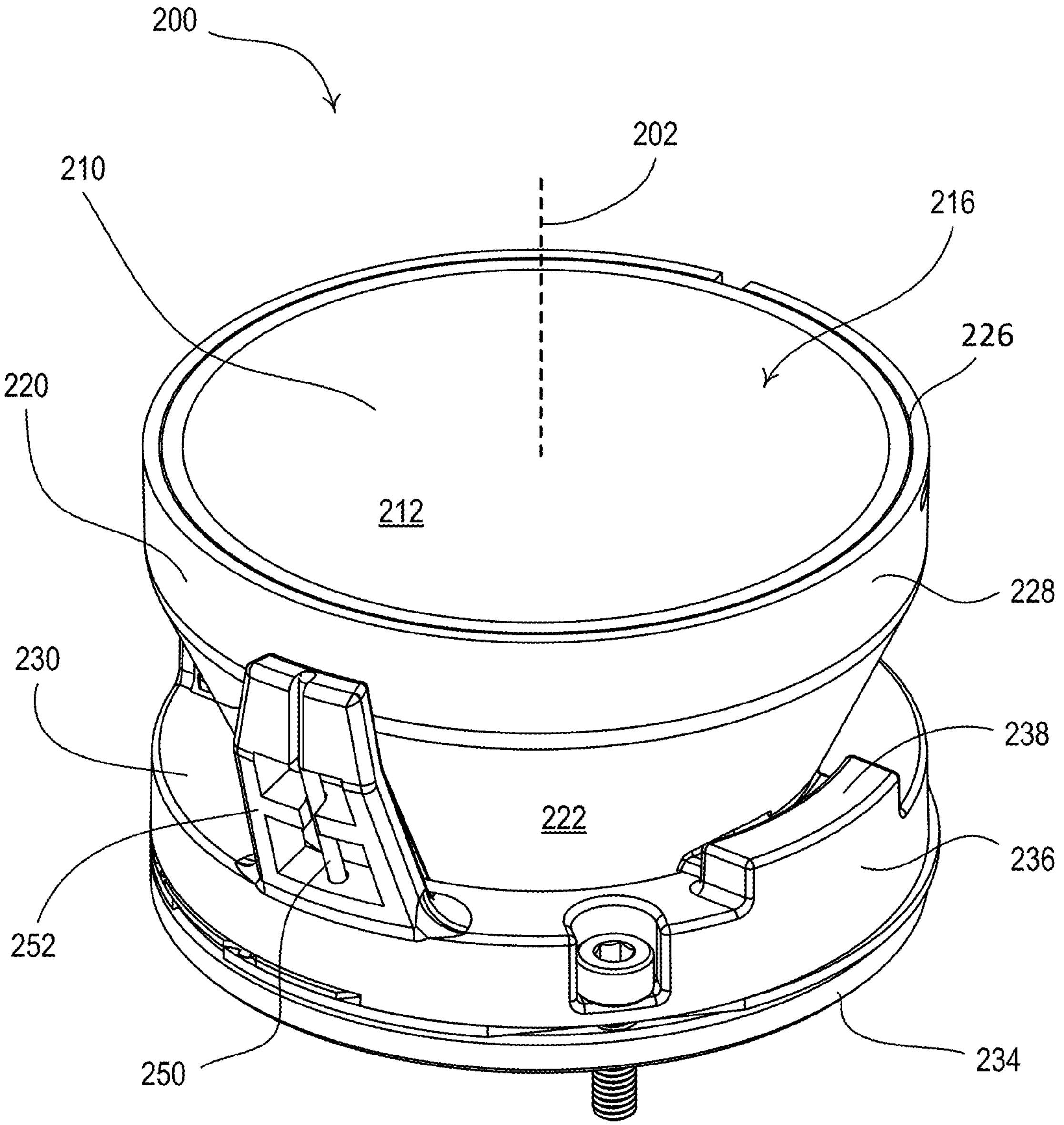
FIG. 3 is a perspective view of an example lighting device assembly, which may be deployed as part of the lighting device shown in FIG. 1.
Figure 4:
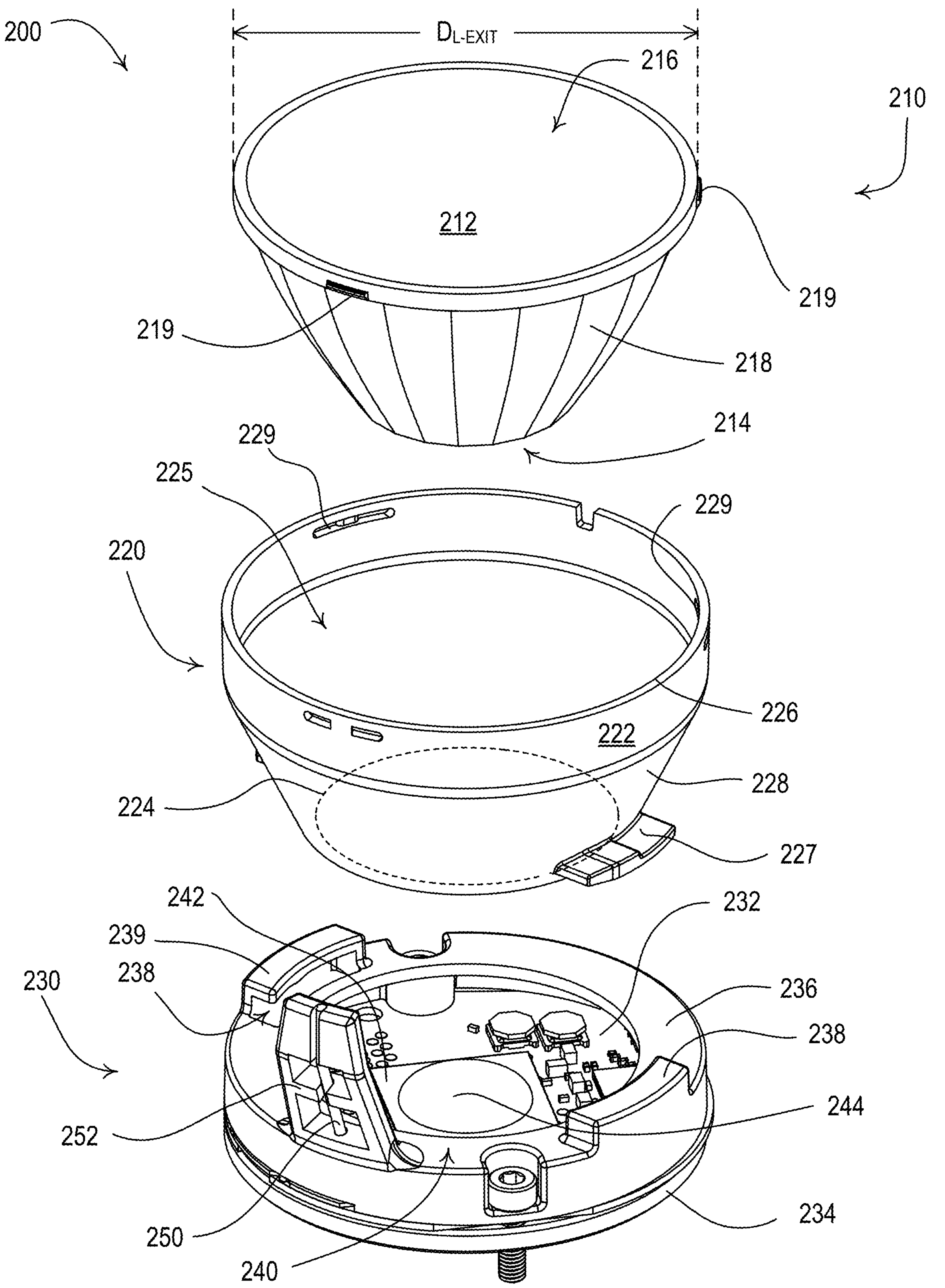
FIG. 4 is an exploded view of the lighting device assembly of FIG. 3.

FIG. 3 is a perspective view of an example lighting device assembly 200 for a lighting device, which may be deployed as the lighting device assembly 130 of the lighting device 100 shown in FIG. 1. FIG. 4 is an exploded view of the lighting device assembly 200. The lighting device assembly 200 may comprise an optical structure 210 (e.g., a lens), a reflector 220, and a light-generation module 230. The light-generation module 230 may comprise a printed circuit board 232, a heat sink 234, and a socket 236. The light-generation module 230 may include an emitter assembly 240 (e.g., an emitter module) having one or more emitters, such as light-emitting diodes (LEDs) (not shown) and/or one or more detectors (e.g., detection LEDs) mounted to a substrate 242, which may be mounted to the printed circuit board 232. The printed circuit board 232 also may have mounted thereto electrical circuitry including one or more drive circuits for controlling the amount of power delivered to the emitters of the emitter assembly 240, one or more control circuits for controlling the drive circuits, and one or more wireless communication circuits for communicating wireless signals (e.g., radio-frequency (RF) signals) with external devices. The printed circuit board 232 may be located between the heat sink 234 and the socket 236. The socket 236 may at least partially enclose the printed circuit board 232. The socket 236 may define two or more connectors 238 that each define a respective slot 239 in which a respective tab 227 of the reflector 220 may be received for connecting the reflector 220 to the light-generation module 230. The lighting device assembly 200 may define a central axis 202 about which the optical structure 210, the reflector 220, and the emitter assembly 240 of the light-generation module 230 may be centered.

The emitter assembly 240 may include an optical element, such as a dome 244 that is configured to enclose the one or more emitters and the one or more detectors mounted to the substrate 242. The emitter assembly 240 may be configured to emit light (e.g., through the dome 244). The substrate 242 may be a ceramic substrate formed from an aluminum nitride or an aluminum oxide material or some other reflective material, and may function to improve output efficiency of the emitter assembly 240 by reflecting light out of the dome 244. The dome 244 may include an optically-transmissive material, such as silicon or the like, and may be formed through an over-molding process, for example. A surface of the dome 244 may be textured (e.g., lightly textured), for example, to increase light scattering and promote color mixing, as well as to reflect a portion (e.g., a small amount) of the emitted light back toward the detectors mounted on the substrate 242, e.g., about 5% (e.g., when the detectors are included). The emitters of the emitter assembly 240 may be thermally coupled to the heat sink 234 via the substrate 242 and the printed circuit board 232. The heat sink 234 may be configured to dissipate heat generated by the emitters of the emitter assembly 240. A thermally-conductive substance may be disposed between the printed circuit board 232 and the heat sink 234.

The light generation module 230 may also comprise an antenna 250 that may be electrically coupled to the one or more wireless communication circuits mounted to the printed circuit board 232. The one or more wireless communication circuit may be configured to transmit and/or receive wireless control signals from/to external control devices via the antenna 250. For example, the wireless communication circuit(s) may include a radio-frequency (RF) transceiver coupled to the antenna 250 for transmitting and/or receiving RF signals. In addition, the wireless communication circuit(s) may be an RF transmitter for transmitting RF signals and an RF receiver for receiving RF signals. The antenna 250 may be held in place by an antenna holder 252. The antenna holder 252 may be connected to the printed circuit board 232 and/or the socket 236. As another example, the wireless communication circuit(s) may be an infrared (IR) transmitter and/or receiver for transmitting and/or receiving IR signals.

The optical structure 210 may comprise a body 212 having a light-entry portion 214, a light-exit portion 216, and a side wall 218. For example, the side wall 218 may define a total internal reflection (TIR) surface (not shown) within the body 212 of the optical structure 210. The side wall 218 may be smooth and/or may be faceted as shown in FIG. 4, although other variations are possible. The reflector 220 may comprise a body 222 (e.g., a conically-shaped body) having a first opening 224 (e.g., which is illustrated as a dashed line in FIG. 4), a second opening 226, and a side wall 228. The body 222 of the reflector 220 may define a cavity 225 (FIG. 4) in which the optical structure 210 may be received (e.g., as shown in FIG. 2). The optical structure 210 may comprise tabs 219 configured to be received in corresponding recesses 229 in the reflector 220 for holding the optical structure 210 within the cavity 225 of the reflector 220.

When the lighting device assembly 200 is assembled (e.g., as shown in FIGS. 2 and 3), the emitters of the emitter assembly 240 may be configured to emit light through the dome 244 and the first opening 224 of the reflector 220, and onto the light-entry portion 214 of the optical structure 210. The optical structure 210 may be configured to conduct the light received by the light-entry portion 214 towards the light-exit portion 216, such that the light may shine through the second opening 226 of the reflector 220. For example, the light-exit portion 216 of the optical structure 210 may be circular to match a circular shape of the second opening 226 of the reflector 220. The TIR surface defined by the side wall 218 of the optical structure 210 may be configured to reflect light towards the light-exit portion 216. In addition, the reflector 220 may be configured to reflect the light towards the light-exit portion 216 of the optical structure 210. The optical structure 210, the reflector 220, and the emitter assembly 240 (e.g., including the emitters and the dome 244) may form an optical system of the lighting device in which the lighting device assembly 200 is installed (e.g., the lighting device 100 shown in FIG. 1).

Figure 5:
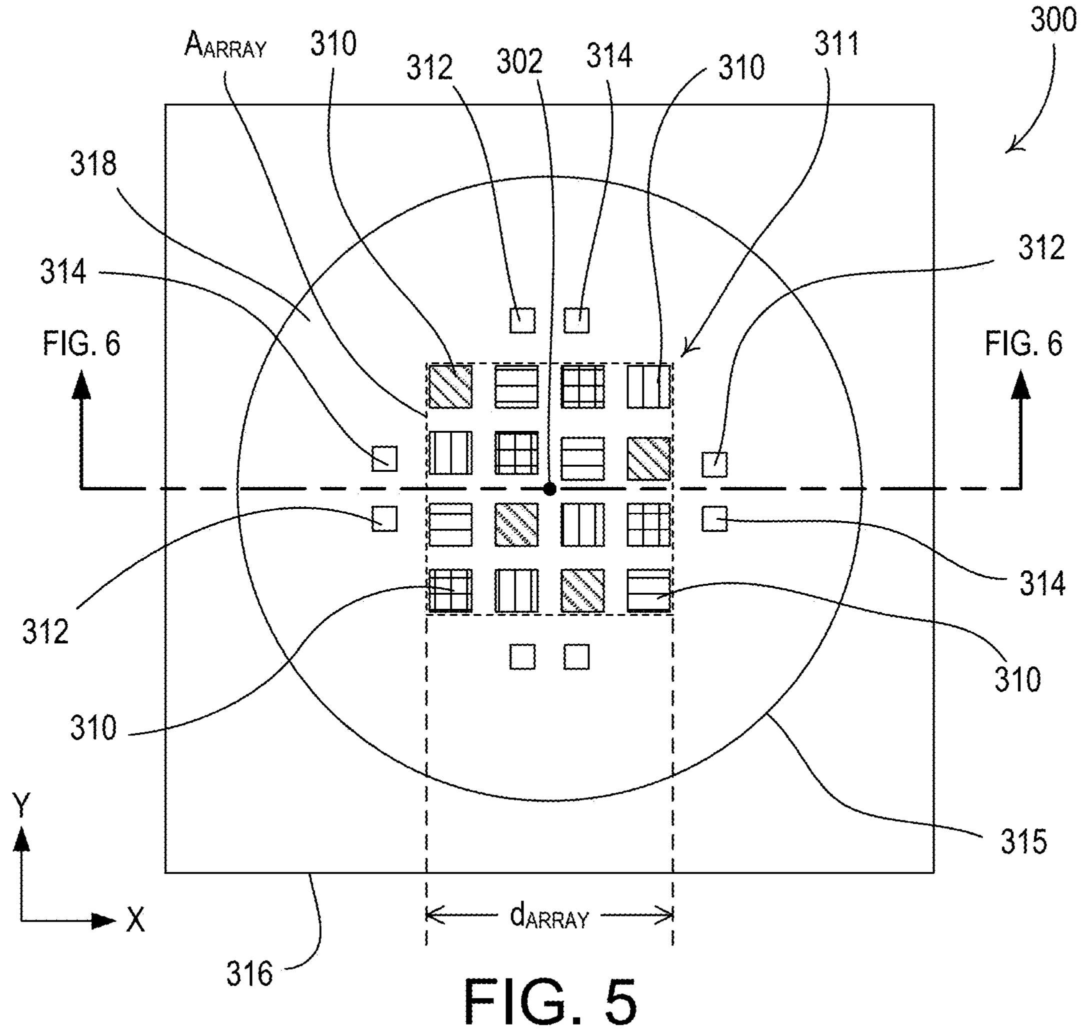
FIG. 5 is a top view of an example emitter assembly of a lighting device assembly, such as the lighting device assembly shown in FIG. 3.
Figure 6:
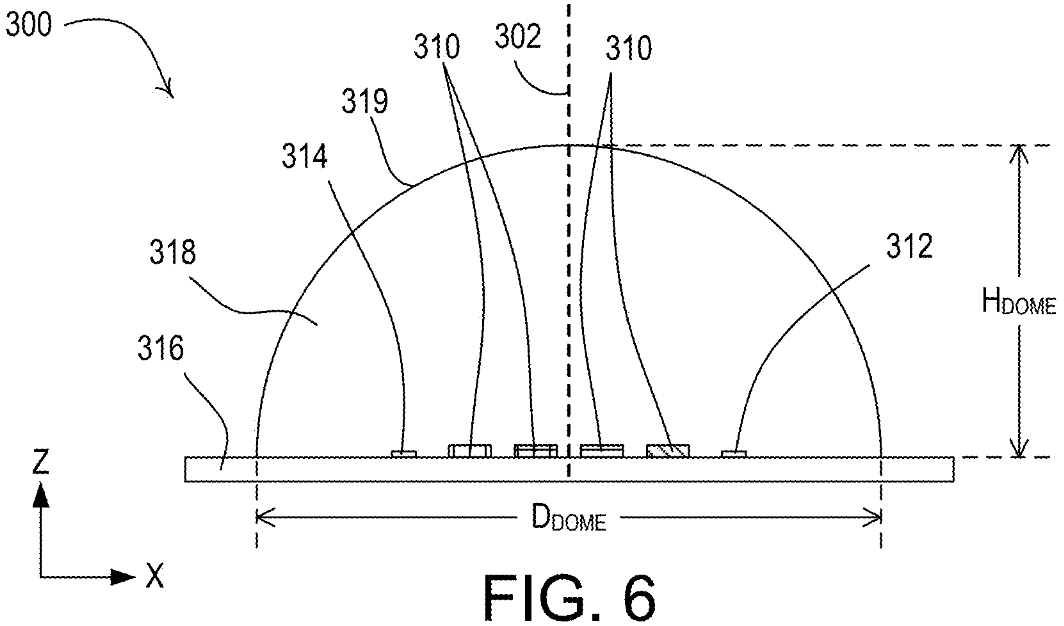
FIG. 6 is a side cross-section view of the emitter assembly of FIG. 5 taken through the center of the emitter assembly.

FIG. 5 is a top view of an example emitter assembly 300 (e.g., an emitter module) of a lighting device, which may be deployed as an emitter assembly of the lighting device 100 shown in FIG. 1 and/or the emitter assembly 240 of the lighting device assembly 200 shown in FIG. 2. FIG. 6 is a side cross-section view of the emitter assembly 300 taken through the center of the emitter assembly 300 (e.g., through the line shown in FIG. 5). The emitter assembly 300 may comprise an array 311 of emitters 310 (e.g., emission LEDs). In some examples, the emitter assembly 300 may also include (e.g., optionally include) one or more detectors 312, 314 (e.g., detection LEDs) also mounted on the substrate 316. For example, the emitter assembly 300 may comprise sixteen emitters 310 and eight detectors 312, 314, although other variations are possible. In some examples, the array 311 may include more or less emitters 310 than shown in FIG. 5. While two types of the detectors 312, 314 are shown in FIG. 5, the emitter assembly 300 may include more or less detectors depending on the emitters 310. In addition, different configurations may of the detectors 312, 314 may be used.

The emitters 310 and the detectors 312, 314 may be mounted to a substrate 316 (e.g., a board) and may be encapsulated by an optical element, such as a dome 318. For example, the substrate 316 may be a ceramic substrate formed from an aluminum nitride or an aluminum oxide material or some other reflective material. In addition, the substrate 316 may comprise a printed circuit board (PCB), such as a rigid PCB (e.g., made from an FR4 material) and/or a metal core PCB. The array 311 of the emitters 310 may be located within an area $A_{ARRAY}$, which may be shaped as, for example, a square. For example, the array 311 of the emitters 310 (e.g., the area $A_{ARRAY}$) may have sides having respective lengths that are each equal to a distance $d_{ARRAY}$ (e.g., approximately 6.2 millimeters). The dome 318 may have an outer periphery 315 that surrounds the emitters 311 and the detectors 312, 314 (e.g., as shown in FIG. 5). The emitter assembly 300 may define a central axis 302 about which the area $A_{ARRAY}$ of the array 311 of the emitters 310 and the dome 318 may be centered.

The emitter assembly 300 may include multiple "chains" of the emitters 310 (e.g., series-coupled emitters). The emitters 310 of each chain may be coupled in series and may conduct the same drive current. Each chain may include emitters 310 that produce illumination at the same peak emission wavelength (e.g., emit light of the same color). The emitters 310 of different chains may emit light of different colors. For example, the emitter assembly 300 may comprise four differently-colored chains of emitters 310 (e.g., red, green, blue, and white or yellow). The array 311 of the emitters 310 may include a chain of four red emitters, a chain of four green emitters, a chain of four blue emitters, and a chain of four white or yellow emitters. The individual emitters 310 in each chain may be scattered about the array, and arranged so that no color appears twice in any row, column, or diagonal, to improve color mixing within the emitter assembly 300. Other variations of numbers of the emitters 310 per chain, the colors of the emitters 310, the numbers of the colors of the emitters 310, the number of chains of the emitters 310, etc., may be used. In addition, patterns other than a square array may be used. Other variations are possible.

The detectors 312, 314 may be located in pairs close to each edge of the array 311 of the emitters 310 and/or and in the middle of the array 311 of the emitters 310 as shown in FIG. 5. Similar to the emitters 310, the detectors 312, 314 may be LEDs that can be used to emit or receive optical or electrical signals. When the detectors 312, 314 are coupled to receive optical signals and emit electrical signals, the detectors may produce currents indicative of incident light from, for example, an emitter, a plurality of emitters, or a chain of emitters. The detectors 312, 314 may be any devices that produce currents indicative of incident light, such as a silicon photodiode or an LED. For example, the detectors 312, 314 may each be an LED having a peak emission wavelength in the range of approximately 550 nm to 700 nm, such that the detectors may not produce photocurrent in response to infrared light (e.g., to reduce interference from ambient light). For example, the first detector 312 of each pair of detectors may comprise a small red, orange or yellow LED, which may be used to measure a luminous flux of the light emitted by the red LEDs of the emitters 310. The second detector 314 may comprise a green LED, which may be used to measure a respective luminous flux of the light emitted by each of the green and blue LEDs of the emitters 310. Both of the first and second detectors 312, 314 may be used to measure the luminous flux of the white LED of the emitters 310 at different wavelengths (e.g., to characterize the spectrum of the light emitted by the white LED). The first detectors 312 may be coupled in parallel in the emitter assembly 300. Similarly, the second detectors 314 may be coupled in parallel in the emitter assembly 300. Other variations are possible.

The dome 318 may comprise, for example, an optically-transmissive material (e.g., a translucent and/or transparent material), such as silicon or the like, and may be formed through an over-molding process, for example. The dome 318 may be a solid structure comprising the optically-transmissive material filled in between the substrate 316 and an outer surface 319 of the dome 318. The outer surface 319 of the dome 318 may be textured (e.g., lightly textured), for example, to increase light scattering and promote color mixing, as well as to reflect a portion (e.g., a small amount) of the light emitted by the emitters 310 back toward the detectors 312, 314 mounted on the substrate 316, e.g., about 5% (e.g., when the detectors 312, 314 are included). The dome 318 may be characterized by a diameter $D_{DOME}$ (e.g., approximately 16 millimeters) in a plane of the emitters 310, where the diameter $D_{DOME}$ may be generally dependent on the size of the array 311 of emitters 310 (e.g., the distance $d_{ARRAY}$). The dome 318 may be characterized by a height $H_{DOME1}$, which may be approximately equal to half of the diameter $D_{DOME}$ of the dome 318 (e.g., approximately 8 millimeters). For example, the dome 318 may have a curved profile, such that the dome 318 may be approximately a hemisphere (e.g., have a hemispherical shape). The emitters 310, the detectors 312, 314, the substrate 316, and the dome 318 may form an optical system. The array 311 of emitters 310 may be located as close as possible together to the central axis 302 of the emitter assembly 300, so as to approximate a centrally-located point source.

Figure 7:
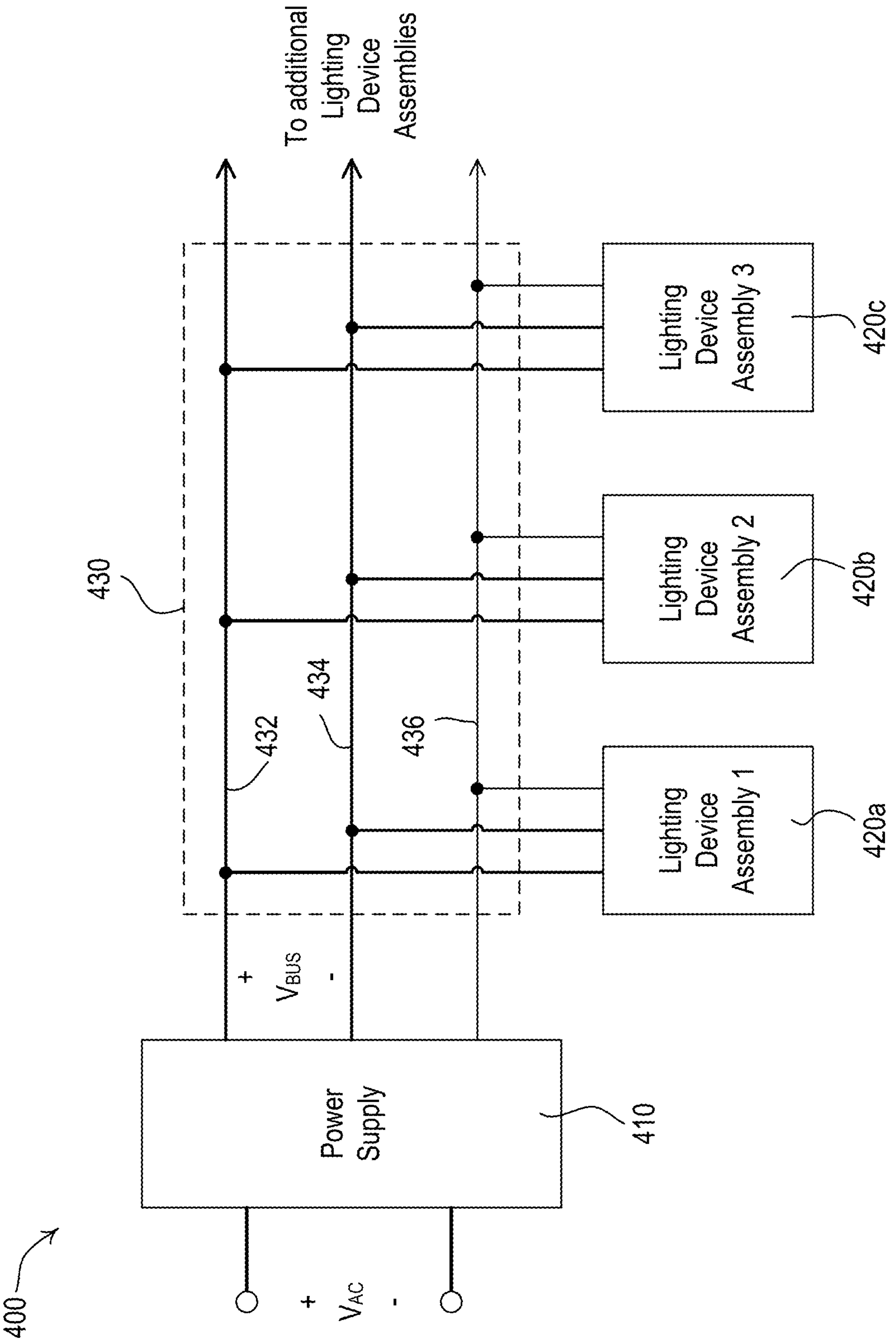
FIG. 7 is a lighting control system including a plurality of lighting devices assemblies, such as the lighting device assembly shown in FIG. 3.

FIG. 7 is a simplified block diagram of an example lighting control system 400. The lighting control system 400 may comprise a power supply 410 (e.g., such as the power supply 180 of the lighting device 100) and one or more lighting device assemblies 420*a*, 420*b*, 420*c* (e.g., such as the lighting device assembly 130 and/or the lighting device assembly 200). Each of the lighting device assemblies 420*a*, 420*b*, 420*c* may comprise a light-generation module (e.g., such as the light-generation module 160 and/or the light-generation module 230). In addition, each of the lighting device assemblies 420*a*, 420*b*, 420*c* may comprise an optical structure (e.g., a lens, such as the optical structure 140 and/or the optical structure 210) and a reflector (e.g., such as the reflector 150 and/or the reflector 220). The light-generation module of each of the lighting device assemblies 420*a*, 420*b*, 420*c* may comprise an emitter assembly (e.g., such as the emitter assembly 240 and/or the emitter assembly 300) configured to emit light, one or more drive circuits for controlling the amount of power delivered to the respective emitter assemblies, one or more control circuits for controlling the drive circuits, and one or more wireless communication circuits for communicating wireless signals (e.g., radio-frequency (RF) signals) with external devices.

In some examples, the lighting control system 400 may be implemented in a single lighting device, such as the lighting device 100. For example, the lighting control system 400 may comprise the lighting device assembly 420*a* (e.g., a single lighting device assembly), and the power supply 410 and the lighting devices assembly 420*a* may be housed together in a single fixture (e.g., in a single housing, such as the housing 110). In addition, the power supply 410 and the lighting devices assembly 420*a* may be housed together in single lamp housing that may have a standard base, such as a screw-in base that may be screwed into a standard Edison socket. In some examples, the lighting control system 400 may comprise multiple lighting devices assemblies (e.g., such as the lighting device assemblies 420*a*, 420*b*, 420*c*), and the lighting devices assemblies 420*a*, 420*b*, 420*c* may be housed together in a single fixture, such as a linear lighting fixture. Further, the lighting device assemblies 420*a*, 420*b*, 420*c* may be located separate from each other and from the power supply 410, such as with a track lighting system.

The power supply 410 may be configured to receive an AC mains line voltage $V_{AC}$ and generate a DC bus voltage $V_{BUS}$. The power supply 410 may be coupled to the lighting device assemblies 420*a*, 420*b*, 420*c* (e.g., to the light-generation modules of the lighting device assemblies 420*a*, 420*b*, 420*c*) via a power-data bus 430. For example, the power-data bus 430 may comprise three electrical conductors housed together in a cable (e.g., the second cable 186). For example, the power-data bus 430 may comprise a first electrical conductor 432 and a second electrical conductor 434 for coupling the bus voltage $V_{BUS}$ and a circuit common of the power supply 180, respectively, to the lighting device assemblies 420*a*, 420*b*, 420*c*. In addition, the power-data bus 430 may comprise a third electrical conductor 436 (e.g., a signal line) to allow for communication between the power supply 410 and the lighting device assemblies 420*a*, 420*b*, 420*c*.

The power supply 410 may be configured to generate a control signal that may be coupled to lighting device assemblies 420*a*, 420*b*, 420*c* (e.g., to the light-generation modules of the lighting device assemblies 420*a*, 420*b*, 420*c*) via the third electrical conductor 436 of the power-data bus 430. For example, the control signal may be referenced to the circuit common of the power supply 410 (e.g., to the second electrical conductor 434). The power supply 410 may be configured to generate the control signal in response to the AC mains line voltage $V_{AC}$, such that the control signal may indicate zero-crossings of the AC mains line voltage. The power supply 410 may be configured to generate a synchronization pulse in the control signal to indicate a time of a zero-crossing of the AC mains line voltage. For example, a falling edge of the synchronization pulse may indicate the time of the zero-crossing of the AC mains line voltage. The power supply 410 may generate the synchronization pulse in the control signal, for example, once every line-cycle of the AC mains line voltage $V_{AC}$ (e.g., at the positive-going zero-crossings at the start of each positive half-cycle). The lighting device assemblies 420*a*, 420*b*, 420*c* (e.g., the light-generation modules of the lighting device assemblies 420*a*, 420*b*, 420*c*) may each be configured to monitor the control signal to detect the synchronization pulse during a synchronization window (e.g., a periodic synchronization window) in each line-cycle of AC mains line voltage $V_{AC}$. The lighting device assemblies 420*a*, 420*b*, 420*c* (e.g., the light-generation modules of the lighting device assemblies 420*a*, 420*b*, 420*c*) may each be configured to cause the emitter assembly of the respective light-generation module to emit light in response to the synchronization pulses of the control signal. The synchronization pulses of the control signal may allow for the coordination (e.g., synchronization) of the lighting device assemblies 420*a*, 420*b*, 420*c* (e.g., the light-generation modules of the lighting device assemblies 420*a*, 420*b*, 420*c*), for example, when the lighting device assemblies 420*a*, 420*b*, 420*c* are generating light in the same space.

The power supply 410 may be configured to transmit data to the lighting device assemblies 420*a*, 420*b*, 420*c* (e.g., to the light-generation modules of the lighting device assemblies 420*a*, 420*b*, 420*c*) via the third electrical conductor 436 of the power-data bus 430. For example, the power supply 410 may be configured to transmit the data to the lighting device assemblies 420*a*, 420*b*, 420*c* as part of the generation of the synchronization pulses of the control signal, e.g., during the synchronization window of each line-cycle of AC mains line voltage. For example, the power supply 410 may be configured to modulate a time length $T_{DATA1}$ of the synchronization pulse to transmit the data. The data may be, for example, a function of the time length $T_{DATA1}$ of the synchronization pulse. For example, the power supply 410 may be configured to transmit an indication of a magnitude of the AC mains lines voltage $V_{AC}$ to the lighting device assemblies 420*a*, 420*b*, 420*c*. The lighting device assemblies 420*a*, 420*b*, 420*c* (e.g., to the light-generation modules of the lighting device assemblies 420*a*, 420*b*, 420*c*) may be configured to cause the emitter assembly of the respective light-generation module to emit light in response to the magnitude of the AC mains line voltage $V_{AC}$. For example, each of the lighting device assemblies 420*a*, 420*b*, 420*c* (e.g., to the light-generation modules of the lighting device assemblies 420*a*, 420*b*, 420*c*) may be configured to foldback (e.g., reduce) the intensity level of the light emitted by the respective emitter assembly when the magnitude of the AC mains line voltage $V_{AC}$ is less than (e.g., less than or equal to) a first threshold, and/or stop emitting light when the magnitude of the AC mains line voltage $V_{AC}$ is less than (e.g., less than or equal to) a second threshold (e.g., which may be less than the first threshold).

Each of the lighting device assemblies 420*a*, 420*b*, 420*c* (e.g., the light-generation modules of the lighting device assemblies 420*a*, 420*b*, 420*c*) may be configured to transmit data to the power supply 410 via the third electrical conductor 436 of the power-data bus 430. For example, each of the lighting device assemblies 420*a*, 420*b*, 420*c* may be configured to transmit the data during a communication window (e.g., a periodic communication window) in each line-cycle of the AC mains line voltage $V_{AC}$. The communication window may be located outside of the synchronization window during each line-cycle (e.g., the communication window does not overlap with the synchronization window). For example, the lighting device assemblies 420*a*, 420*b*, 420*c* may each be configured to transmit the data to the power supply 410 by generating a communication pulse in the control signal on the third electrical conductor 436 of the power-data bus 430 during the communication window. The lighting device assemblies 420*a*, 420*b*, 420*c* may each be configured to generate, for example, a single communication pulse in the control signal during each communication window (e.g., during each line-cycle). The lighting device assemblies 420*a*, 420*b*, 420*c* may be configured to generate the respective communication pulses during different time period (e.g., time slots) during the communication window in each line-cycle of the AC mains line voltage $V_{AC}$.

Each of the lighting device assemblies 420*a*, 420*b*, 420*c* (e.g., the light-generation modules of the lighting device assemblies 420*a*, 420*b*, 420*c*) may be configured to transmit data to the power supply 410 by modulating the respective communication pulse during the communication window. For example, the lighting device assemblies 420*a*, 420*b*, 420*c* may each be configured to modulate a time length $T_{DATA2}$ of the respective communication pulse to transmit the data. The data may be, for example, a function of the time length $T_{DATA2}$ of the communication pulse. For example, the lighting device assemblies 420*a*, 420*b*, 420*c* may each be configured to transmit to the power supply 410 an indication of the magnitude of the bus voltage $V_{BUS}$ received from the power supply 410 via the power-data bus 430. In addition, the lighting device assemblies 420*a*, 420*b*, 420*c* may each be configured to transmit an indication of an amount of power to be drawn from the power supply 410 during a subsequent line-cycle of the AC mains line voltage $V_{AC}$ (e.g., during the next line-cycle). For example, the lighting device assemblies 420*a*, 420*b*, 420*c* may each be configured to transmit an indication of an actual amount of power to be drawn from the power supply 410 during the subsequent line-cycle of the AC mains line voltage and/or an indication of an amount of a change in the amount of power to be drawn from the power supply 410 during the subsequent line-cycle of the AC mains line voltage. The power supply 410 may be configured to control the generation of the DC bus voltage $V_{BUS}$ in response to the indication of the magnitude of the bus voltage $V_{BUS}$ and/or the indication of the amount of power to be drawn from the power supply 410 during the subsequent line-cycle.

Figure 8:
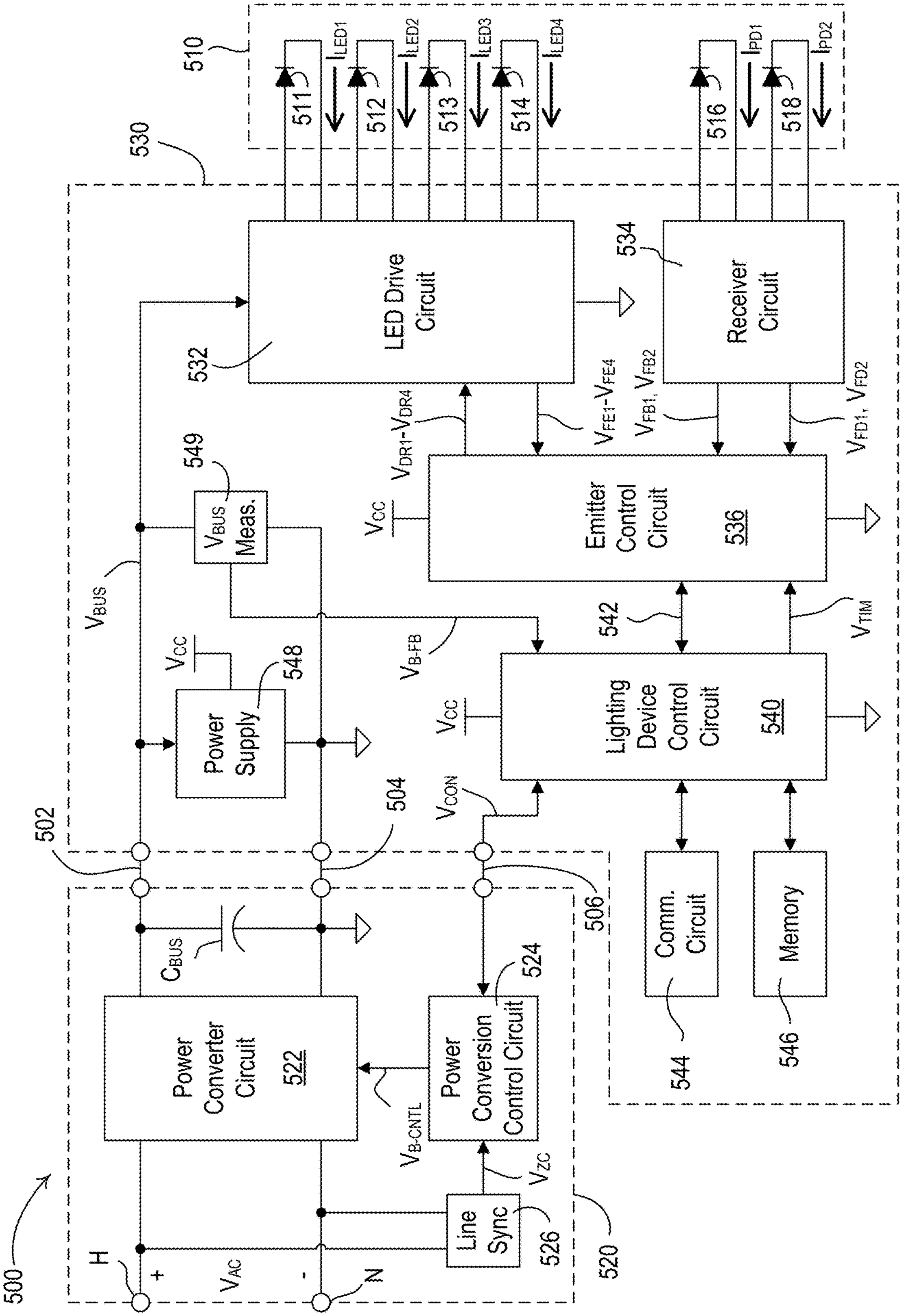
FIG. 8 is a simplified block diagram of an example lighting device, such as the lighting device shown in FIG. 1.

FIG. 8 is a simplified block diagram of an example lighting device 500, such as a controllable lighting device (e.g., the lighting device 100 shown in FIG. 1). The lighting device 500 may comprise one or more emitter assemblies 510 (e.g., the emitter assembly 240 shown in FIGS. 3 and 4 and/or the emitter assembly 300 shown in FIGS. 5 and 6). For example, the lighting device 500 may comprise an emitter assembly 510 that may include one or more emitters 511, 512, 513, 514. Each of the emitters 511, 512, 513, 514 is shown in FIG. 8 as a single LED, but may each comprise a plurality of LEDs connected in series (e.g., a chain of LEDs), a plurality of LEDs connected in parallel, or a suitable combination thereof, depending on the particular lighting system. In addition, each of the emitters 511, 512, 513, 514 may comprise one or more organic light-emitting diodes (OLEDs). For example, the first emitter 511 may represent a chain of red LEDs, the second emitter 512 may represent a chain of blue LEDs, the third emitter 513 may represent a chain of green LEDs, and the fourth emitter 514 may represent a chain of white or amber LEDs. The emitters 511, 512, 513, 514 may be controlled to adjust a brightness (e.g., a luminous flux or an intensity) and/or a color (e.g., a color temperature) of a cumulative light output of the lighting device 500.

The emitter assembly 510 may also comprise one or more detectors 516, 518 (e.g., photodiodes) that may produce respective photodiode currents $I_{PD1}$, $I_{PD2}$ (e.g., detector signals) in response to incident light. For example, the first detector 516 may represent a single red, orange or yellow LED or multiple red, orange or yellow LEDs in parallel (e.g., the first detectors 316 of the emitter assembly 300), and the second detector 518 may represent a single green LED or multiple green LEDs in parallel (e.g., the second detectors 318 of the emitter assembly 300). The emitter assembly 510 may be mounted on a light-generation printed circuit board of a lighting device assembly of the lighting device 500 (e.g., the printed circuit board 162 of the light-generation module 160 of the lighting device assembly 130 and/or the printed circuit board 232 of the light-generation module 230 of the lighting device assembly 200).

The lighting device 500 may comprise a power conversion stage 520 (e.g., the power supply 180 of the lighting device 100). The power conversion stage 520 may comprise a power converter circuit 522, which may receive a source voltage, such as an AC mains line voltage $V_{AC}$, via a hot connection H and a neutral connection N. The power converter circuit 522 may generate a DC bus voltage $V_{BUS}$ (e.g., approximately 15-20V) across a bus capacitor $C_{BUS}$. The power converter circuit 522 may comprise, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 522 may provide electrical isolation between the AC power source and the emitters 511, 512, 513, 514, and may operate as a power factor correction (PFC) circuit to adjust the power factor of the lighting device 500 towards a power factor of one. The power conversion stage 520 may comprise a power conversion control circuit 524 configured to control the operation of the power converter circuit 522 for generating the bus voltage $V_{BUS}$. The power conversion control circuit 524 may be configured to generate bus voltage control signal $V_{B-CNTL}$ that may be provided to the power converter circuit 522 for controlling the power converter circuit 522 to generate the bus voltage $V_{BUS}$.

The lighting device 500 may comprise a light-generation module stage 530 (e.g., the light-generation module 160 of the lighting device assembly 130 and/or the light-generation module 230 of the lighting device assembly 200). For example, the circuitry of the light-generation module stage 530 may be mounted to a light-generation printed circuit board to which the emitter assembly 510 is also mounted (e.g., the printed circuit board 162 of the light-generation module 160 of the lighting device assembly 130 and/or the printed circuit board 232 of the light-generation module 230 of the lighting device assembly 200). The light-generation module stage 530 may comprise an LED drive circuit 532 for controlling (e.g., individually controlling) the power delivered to and the luminous flux of the light emitted of each of the emitters 511, 512, 513, 514 of the emitter assembly 510. The LED drive circuit 1232 may adjust magnitudes of respective LED drive currents $I_{LED1}$, $I_{LED2}$, $I_{LED3}$, $I_{LED4}$ conducted through the emitters 511, 512, 513, 514. The LED drive circuit 532 may comprise one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 532 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The LED drive circuit 532 may receive the bus voltage $V_{BUS}$ from the power converter circuit 522 of the power conversion state 520. For example, the light-generation stage 530 may be electrically coupled to the power conversion stage 520, for example, via a cable that has two or more electrical conductors (e.g. wires) and extends through the housing of the lighting device 500 between the power conversion stage 520 and the light-generation stage 530 (e.g., the second cable 186 of the lighting device 100). For example, the cable may comprise a first electrical conductor 502 for electrically connecting the bus voltage $V_{BUS}$ from the power converter circuit 522 to the LED driver circuit 532, and a second electrical conductor 504 for electrically connecting circuit common of the power converter circuit 522 to circuit common of the LED driver circuit 532 (e.g., circuit common of the light-generation module stage 530). While the power conversion stage 520 is shown coupled to just the light-generation module stage 530 in FIG. 8 (e.g., a single light-generation module stage), the power conversion stage 520 could also be coupled to additional light-generation modules stages for powering respective emitter assemblies (e.g., additional instances of the emitter module 510).

The light-generation module stage 530 may comprise a receiver circuit 534 that may be electrically coupled to the detectors 516, 518 of the emitter assembly 510 for generating respective optical feedback signals $V_{FB1}$, $V_{FB2}$ in response to the photodiode currents $I_{PD1}$, $I_{PD2}$. The receiver circuit 534 may comprise one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The light-generation module stage 530 may comprise an emitter control circuit 536 for controlling the LED drive circuit 532 to control the intensities of the emitters 511, 512, 513, 514 of the emitter assembly 510. The emitter control circuit 536 may comprise, for example, a microprocessor, a microcontroller, a programmable logic device (PLD), an application specific integrated circuit (ASIC), a field-programmable gate array (FPGA), or any other suitable processing device or controller. The emitter control circuit 536 may generate one or more drive signals $V_{DR1}$, $V_{DR2}$, $V_{DR3}$, $V_{DR4}$ for controlling the respective regulation circuits in the LED drive circuit 532. The emitter control circuit 536 may receive the optical feedback signals $V_{FB1}$, $V_{FB2}$ from the receiver circuit 534 for determining the luminous flux $L_E$ of the light emitted by the emitters 511, 512, 513, 514.

The emitter control circuit 536 may receive a plurality of emitter forward-voltage feedback signals $V_{FE1}$, $V_{FE2}$, $V_{FE3}$, $V_{FE4}$ from the LED drive circuit 532 and a plurality of detector forward-voltage feedback signals $V_{FD1}$, $V_{FD2}$ from the receiver circuit 534. The emitter forward-voltage feedback signals $V_{FE1}$-$V_{FE4}$ may be representative of the magnitudes of the forward voltages of the respective emitters 511, 512, 513, 514, which may indicate temperatures $T_{E1}$, $T_{E2}$, $T_{E3}$, $T_{E4}$ of the respective emitters. If each emitter 511, 512, 513, 514 comprises multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 516, 518, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 516, 518.

The lighting device 500 may comprise a lighting device control circuit 540 (e.g., a module control circuit) that may be electrically coupled to the emitter control circuit 536 via a communication bus 542 (e.g., an $I^2C$ communication bus). The lighting device control circuit 540 may be configured to control the emitter assembly 510 to control the brightness (e.g., the luminous flux) and/or the color (e.g., the color temperature) of the cumulative light emitted by the lighting device 500. The lighting device control circuit 540 may comprise, for example, a microprocessor, a microcontroller, a programmable logic device (PLD), an application specific integrated circuit (ASIC), a field-programmable gate array (FPGA), or any other suitable processing device or controller. The lighting device control circuit 540 may be configured to adjust (e.g., dim) a present intensity $L_{PRES}$ (e.g., a present brightness) of the cumulative light emitted by the lighting device 500 towards a target intensity $L_{TRGT}$ (e.g., a target brightness), which may range across a dimming range of the controllable lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). The lighting device control circuit 540 may be configured to adjust a present color temperature $T_{PRES}$ of the cumulative light emitted by the lighting device 500 towards a target color temperature $T_{TRGT}$, which may range between a cool-white color temperature (e.g., approximately 3100-4500 K) and a warm-white color temperature (e.g., approximately 2000-3000 K). In some examples, the lighting device control circuit 540 may be coupled to additional emitter control circuits (e.g., additional instances of the emitter control circuit 536) to allow for control of additional emitter assemblies (e.g., additional instances of the emitter assembly 510).

The lighting device 500 may comprise a communication circuit 544 coupled to the lighting device control circuit 540. The communication circuit 544 may comprise a wireless communication circuit, such as, for example, a radio-frequency (RF) transceiver coupled to an antenna for transmitting and/or receiving RF signals. The wireless communication circuit may be an RF transmitter for transmitting RF signals and an RF receiver for receiving RF signals. The communication circuit 544 may be coupled to the hot connection H and the neutral connection N of the lighting device 500 for transmitting a control signal via the electrical wiring using, for example, a power-line carrier (PLC) communication technique. The lighting device control circuit 540 may be configured to determine the target intensity $L_{TRGT}$ for the lighting device 500 in response to messages (e.g., digital messages) received via the communication circuit 544.

The lighting device 500 may comprise a memory 546 configured to store operational characteristics of the lighting device 500 (e.g., the target intensity $L_{TRGT}$, the target color temperature $T_{TRGT}$, the low-end intensity $L_{LE}$, the high-end intensity $L_{HE}$, etc.). The memory may be implemented as an external integrated circuit (IC) or as an internal circuit of the lighting device control circuit 540. The memory 546 may comprise a computer-readable storage media or machine-readable storage media that maintains computer-executable instructions for performing one or more procedure and/or functions as described herein. For example, the memory 546 may comprise computer-executable instructions or machine-readable instructions that when executed by the control circuit configure the control circuit to provide one or more portions of the procedures described herein. The lighting device control circuit 540 may access the instructions from memory 546 for being executed to cause the control circuit 546 to operate as described herein, or to operate one or more other devices as described herein. The memory 546 may comprise computer-executable instructions for executing configuration software. For example, the operational characteristics stored in the memory 546 may be configured during a configuration procedure of the lighting device 500.

The lighting device 500 may comprise a power supply 548 that may receive the bus voltage $V_{BUS}$ from the power converter circuit 522 via the cable having the first electrical conductor 502 and the second electrical conductor 504. The power supply 548 may be configured to generate a supply voltage $V_{CC}$ for powering the lighting device control circuit 540 and other low-voltage circuitry of the controllable lighting device from the bus voltage $V_{BUS}$. The lighting device 500 may further comprise a bus voltage measurement circuit 549, which may be configured to receive the bus voltage $V_{BUS}$ and generate a bus voltage feedback signal $V_{B-FB}$, which may indicate the magnitude of the bus voltage $V_{BUS}$. The lighting device control circuit 540 may receive the bus voltage feedback signal $V_{B-FB}$ for determining the magnitude of the bus voltage $V_{BUS}$ as received from the power converter circuit 522 via the cable having the first electrical conductor 502 and the second electrical conductor 504.

The cable coupled between the power conversion stage 520 and the light-generation module stage 530 may include a third electrical conductor 506 (e.g., a signal line). For example, the cable coupled between the power conversion stage 520 and the light-generation module stage 530 may comprise a three-wire cable. The third electrical conductor 506 may electrically couple the power converter circuit 522 of the power conversion stage 520 to the lighting device control circuit 540 of the light-generation module stage 530 to allow for communication between the power converter control circuit 524 and the lighting device control circuit 540. For example, the power conversion control circuit 524 may comprise a first output (e.g., a transmit port) coupled to the third electrical conductor 506 via a first optocoupler (not shown), and a second output (e.g., a receive port) coupled to the third electrical conductor 506 via a second optocoupler (not shown). In some examples, the first output and the second output of the power conversion control circuit 524 may be coupled to the third electrical conductor 506 via a single optocoupler (not shown). In addition, the lighting device control circuit 540 may comprise a first output (e.g., a transmit port) coupled to the third electrical conductor 506 via a third optocoupler (not shown), and a second output (e.g., a receive port) coupled to the third electrical conductor 506 via a fourth optocoupler (not shown). For example, the signal line may comprise a half-duplex communication link. Further, it should be appreciated that, although illustrated as a single cable, the cable that is coupled between the power conversion stage 520 and the light-generation module stage 530 may be more than one cable.

The third electrical conductor 506 may be configured to conduct a control signal $V_{CON}$ between the power conversion control circuit 524 and the lighting device control circuit 540. For example, the power conversion control circuit 524 may be configured to generate the control signal $V_{CON}$ that may be received by the lighting device control circuit 540 (e.g., via the third electrical conductor 506). In addition, the lighting device control circuit 540 may be configured to generate the control signal $V_{CON}$ that may be received by the power conversion control circuit 524 (e.g., via the third electrical conductor 506). For example, the control signal $V_{CON}$ may be referenced to the circuit common of the power conversion stage 520 and the light-generation module stage 530 (e.g., to the second electrical conductor 504). The control signal $V_{CON}$ may include a synchronization pulse during a synchronization window and one or more communication pulses (e.g., a single communication pulse and/or a digital message including a plurality of communication pulses) in a communication window. The communication window may be located outside of the synchronization window during each line-cycle of the AC mains line voltage $V_{AC}$ (e.g., the communication window does not overlap with the synchronization window). The synchronization window and the communication window may repeat each line-cycle of the AC mains line voltage $V_{AC}$ (e.g., the synchronization window may be a periodic synchronization window and the communication window may be a periodic communication window).

The power conversion control circuit 524 may be configured to generate the control signal $V_{CON}$ in response to the AC mains line voltage $V_{AC}$, such that the control signal $V_{CON}$ indicates zero-crossings of the AC mains line voltage. The power conversion control circuit 524 may be configured to generate the synchronization pulse in the control signal $V_{CON}$ to indicate a time of a zero-crossing of the AC mains line voltage $V_{AC}$. For example, a falling edge of the synchronization pulse may indicate the times of the zero-crossings of the AC mains line voltage $V_{AC}$. The power conversion stage 520 may comprise a line sync circuit 526 that may receive the AC mains line voltage $V_{AC}$ via the hot connection H and the neutral connection N. For example, the line sync circuit 526 may comprise a zero-cross detect circuit that may be configured to generate a zero-cross signal $V_{ZC}$ that may indicate the zero-crossings of the AC mains line voltage $V_{AC}$. The power conversion control circuit 524 may receive the zero-cross signal $V_{ZC}$ for generating the synchronization pulse in the control signal $V_{CON}$ to indicate the times of the zero-crossings of the AC mains line voltage $V_{AC}$ (e.g., in accordance with the frequency of the AC mains line voltage $V_{AC}$). For example, the power conversion control circuit 524 may be configured to generate the synchronization pulse in the control signal $V_{CON}$ once every line-cycle of the AC mains line voltage $V_{AC}$ (e.g., at the positive-going zero-crossings at the start of each positive half-cycle).

The lighting device control circuit 540 may be configured to determine the times of the zero-crossings of the AC mains line voltage $V_{AC}$ in response to the synchronization pulses generated in the control signal by the power conversion control circuit 524. The lighting device control circuit 540 may be configured to monitor the control signal $V_{CON}$ to detect the synchronization pulse during the synchronization window in each line-cycle of AC mains line voltage. The lighting device control circuit 540 may be configured to control the emitter assembly 510 to cause the lighting device assembly to emit light in response to the synchronization pulses of the control signal $V_{CON}$. The lighting device 500 may use the synchronization pulses of the control signal $V_{CON}$ to synchronize the lighting device 500 with other lighting devices installed near the lighting device 500 in accordance with the frequency of the AC mains line voltage $V_{AC}$ (e.g., utilizing the timing of the zero crossings of the AC mains line voltage $V_{AC}$). For example, the lighting device 500 may use the synchronization pulses of the control signal $V_{CON}$ to coordinate the timing at which the lighting device 500 and the other lighting devices may perform a measurement procedure.

The lighting device control circuit 540 may be configured to generate a timing signal $V_{TIM}$ in response to the synchronization pulses in the control signal $V_{CON}$ received from the power conversion control circuit 522. In some examples, the timing signal $V_{TIM}$ may be a sinusoidal waveform (e.g., a digital sinusoidal waveform), which is generated at a frequency that is determined based on the frequency of synchronization pulses of the control signal $V_{CON}$. The emitter control circuit 536 may receive the timing signal $V_{TIM}$ generated by the lighting device control circuit 540. As noted herein, the emitter control circuit 536 may use the timing signal $V_{TIM}$ to coordinate a timing at which the light device 500 can perform the measurement procedure (e.g., to reduce the likelihood that the lighting device 500 causes interference with a respective measurement procedure of another nearby lighting device). For example, the emitter control circuit 536 may use the timing signal $V_{TIM}$ to determine a time to measure optical feedback information of the emitters 511, 512, 513, 514 of the emitter assembly 510 (e.g., to perform color and/or intensity control refinement) when other lighting devices are not emitting light.

The power conversion control circuit 524 may be configured to transmit data to the lighting device control circuit 540 via the third electrical conductor 506. In some examples, the power conversion control circuit 524 may be configured to transmit the data to the lighting device control circuit 540 as part of the generation of the synchronization pulses of the control signal, e.g., during the synchronization window of each line-cycle of AC mains line voltage. For example, the power conversion control circuit 524 may be configured to modulate a time length $T_{DATA1}$ of the synchronization pulse to transmit the data. The lighting device control circuit 540 may be configured to monitor the control signal $V_{CON}$ during the synchronization window to determine the time length $T_{DATA1}$ of the synchronization pulse. For example, the lighting device control circuit 540 may be configured to detect the rising edge and the falling edge of the synchronization pulse, and calculate the time length $T_{DATA1}$ of the synchronization pulse as the difference between the time of the falling edge and the time of the rising edge. The data may be, for example, encoded in the time length $T_{DATA1}$ of the synchronization pulse. The lighting device control circuit 540 may be configured to convert the time length $T_{DATA1}$ of the synchronization pulse into a digital value that may be processed to determine the data. In addition, the power conversion control circuit 524 may be configured to encode the data in a data message (e.g., a digital message) that is transmitted to the lighting device control circuit 540 via the third electrical conductor 506 in the control signal $V_{CON}$ during the communication window. The lighting device control circuit 540 may be configured to decode the data messages received from the power conversion control circuit 524 to determine the data.

The power conversion control circuit 524 may be configured to transmit, for example, an indication of a magnitude of the AC mains lines voltage $V_{AC}$ to the lighting device control circuit 540 via the control signal $V_{CON}$. The lighting device control circuit 540 may be configured to cause the emitter control circuit 536 to control the emitter assembly 510 in response to the magnitude of the AC mains line voltage $V_{AC}$. For example, the lighting device control circuit 540 may be configured to foldback (e.g., reduce) the intensity level of the light emitted by the emitter assembly 510 when the magnitude of the AC mains line voltage $V_{AC}$ is less than (e.g., less than or equal to) a first threshold, and/or stop emitting light when the magnitude of the AC mains line voltage $V_{AC}$ is less than (e.g., less than or equal to) a second threshold (e.g., which may be less than the first threshold).

The lighting device control circuit 540 may be configured to transmit data to the power conversion control circuit 522 via the third electrical conductor 506. For example, the lighting device control circuit 540 may be configured to transmit the data during the communication window in each line-cycle of the AC mains line voltage. In some examples, the lighting device control circuit 540 may be configured to transmit the data to the power conversion control circuit 522 by generating a communication pulse in the control signal $V_{CON}$ (e.g., on the third electrical conductor 506) during the communication window. The lighting device control circuit 540 may be configured to generate, for example, a single communication pulse in the control signal $V_{CON}$ during each communication window (e.g., during each line-cycle). For example, the lighting device control circuit 540 may be configured to modulate a time length $T_{DATA2}$ of the communication pulse to transmit the data. The power conversion control circuit 524 may be configured to monitor the control signal $V_{CON}$ during the communication window to determine the time length $T_{DATA2}$ of the communication pulse. For example, the lighting device control circuit 540 may be configured to detect the rising edge and the falling edge of the communication pulse, and calculate the time length $T_{DATA2}$ of the communication pulse as the difference between the time of the falling edge and the time of the rising edge. The data may be, for example, encoded in the time length $T_{DATA2}$ of the communication pulse. The power conversion control circuit 524 may be configured to convert the time length $T_{DATA2}$ of the communication pulse into a digital value that may be processed to determine the data. In addition, the lighting device control circuit 540 may be configured to encode the data in a data message (e.g., a digital message) that is transmitted to the lighting device control circuit 540 via the third electrical conductor 506 in the control signal $V_{CON}$ during the communication window. The power conversion control circuit 522 may be configured to decode the data messages received from the lighting device control circuit 540 to determine the data.

The lighting device control circuit 540 may be configured to transmit one or more pieces of data to the power conversion control circuit 524 via the control signal $V_{CON}$. For example, the lighting device control circuit 540 may be configured to transmit an indication of the magnitude of the bus voltage $V_{BUS}$ received from the power converter circuit 522 via the first and second electrical conductors 502, 504 (e.g., as determined from the bus voltage feedback signal $V_{B\text{-}FB}$ received from the bus voltage measurement circuit 549). The power conversion control circuit 524 may be configured to generate bus voltage control signal $V_{B\text{-}CNTL}$ for controlling the power converter circuit 524 in response to the magnitude of the bus voltage $V_{BUS}$ received from the lighting device control circuit 540 to adjust the magnitude of the bus voltage $V_{BUS}$ towards a target bus voltage. In addition, the lighting device control circuit 540 may be configured to transmit, to the power conversion control circuit 522, an indication of an amount of power to be drawn from the power conversion stage 520 (e.g., from the bus capacitor $C_{BUS}$) during a subsequent line-cycle of the AC mains line voltage (e.g., during the next line-cycle). For example, the lighting device control circuit 540 may be configured to transmit an indication of an actual amount of power to be drawn from the power conversion stage 520 during the subsequent line-cycle of the AC mains line voltage and/or an indication of an amount of a change in the amount of power to be drawn from the power conversion stage 520 during the subsequent line-cycle of the AC mains line voltage. The lighting device control circuit 540 may be configured to determine the amount of power to be drawn from the power conversion stage 520 in response to the target intensity $L_{TRGT}$ for the lighting device 500 determined from the messages received via the communication circuit 544. The power conversion control circuit 522 may be configured to control the bus voltage control signal $V_{B\text{-}CNTL}$ provided to the power converter circuit 522 to adjust the magnitude of the bus voltage $V_{BUS}$ in response to the indication of (e.g., in anticipation of) the amount of power to be drawn from the power conversion stage 520 during the subsequent line-cycle.

In some examples, the lighting device control circuit 540 may be configured to encode one or more pieces of data into a single communication pulse. For example, the lighting device control circuit 540 may be configured to set the time length $T_{DATA2}$ of the communication pulse based on both the magnitude of the bus voltage $V_{BUS}$ and/or the amount of power to be drawn from the power conversion stage 520 during the subsequent line-cycle. The power conversion control circuit 524 may be configured to convert the time length $T_{DATA2}$ of the communication pulse into a digital value that may be processed to determine the indication of the magnitude of the bus voltage $V_{BUS}$ and/or the indication of the amount of power to be drawn from the power conversion stage 520 during the subsequent line-cycle. Additionally or alternatively, the lighting device control circuit 540 may be configured to encode the one or more pieces of data into multiple communication pulses (e.g., a first communication pulse for encoding the indication of the magnitude of the bus voltage $V_{BUS}$ and a second communication pulse for encoding the indication of the amount of power to be drawn from the power conversion stage 520 during the subsequent line-cycle).

When the lighting device 500 is on, the light source control circuit 540 may be configured to control the emitter assembly 510 to emit light substantially all of the time. The lighting device control circuit 540 may be configured to control the emitter assembly 510 to disrupt the normal emission of light to measure one or more operational characteristics of the emitter assemblies during periodic measurement intervals (e.g., as part of the measurement procedure of the lighting device 500). For example, during the measurement intervals, the emitter control circuit 536 may be configured to individually turn on each of the different-colored emitters 511, 512, 513, 514 of the emitter assembly 510 (e.g., while turning of the other emitters) and measure the luminous flux of the light emitted by that emitter using one of the two detectors 516, 518. For example, the emitter control circuit 536 may turn on the first emitter 511 of the emitter assembly 510 (e.g., at the same time as turning off the other emitters 512, 513, 514 and determine the luminous flux $L_E$ of the light emitted by the first emitter 511 in response to the first optical feedback signal $V_{FB1}$ generated from the first detector 516. In addition, the emitter control circuit 536 may be configured to drive the emitters 511, 512, 513, 514 and the detectors 516, 518 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter assemblies in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 500 may be stored in the memory 546 as part of a calibration procedure performed during manufacturing of the lighting device 500. Calibration values may be stored for each of the emitters 511, 512, 513, 514 and/or the detectors 516, 518 of the emitter assembly 510. For example, calibration values may be stored for measured values of luminous flux (e.g., in lumens), x-chromaticity, y-chromaticity, emitter forward voltage, photodiode current, and detector forward voltage. For example, the luminous flux, x-chromaticity, and y-chromaticity measurements may be obtained from the emitters 511, 512, 513, 514 using an external calibration tool, such as a spectrophotometer. The values for the emitter forward voltages, photodiode currents, and detector forward voltages may be measured internally to the lighting device 500. The calibration values for each of the emitters 511, 512, 513, 514 and/or the detectors 516, 518 may be measured at a plurality of different drive currents, and/or at a plurality of different operating temperatures.

After installation, the lighting device control circuit 540 of the lighting device 500 may use the calibration values stored in the memory 546 to maintain a constant light output from the emitter assembly 510. The lighting device control circuit 540 may determine target values for the luminous flux to be emitted from the emitters 511, 512, 513, 514 to achieve the target intensity $L_{TRGT}$ and/or the target color temperature $T_{TRGT}$ for the lighting device 500. The lighting device control circuit 540 may determine the magnitudes for the respective drive currents $I_{LED1}$-$I_{LED4}$ for the emitters 511, 512, 513, 514 based on the determined target values for the luminous flux to be emitted from the emitters 511, 512, 513, 514. When the age of the lighting device 500 is zero, the magnitudes of the respective drive currents $I_{LED1}$-$I_{LED4}$ for the emitters 511, 512, 513, 514 may be controlled to initial magnitudes $I_{LED-INITIAL}$.

The light output of the emitter assembly 510 may decrease as the emitters 511, 512, 513, 514 age. The lighting device control circuit 540 may be configured to increase the magnitudes of the drive current $I_{DR}$ for the emitters 511, 512, 513, 514 to adjusted magnitudes $I_{LED-ADJUSTED}$ to achieve the determined target values for the luminous flux of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

Figure 9:
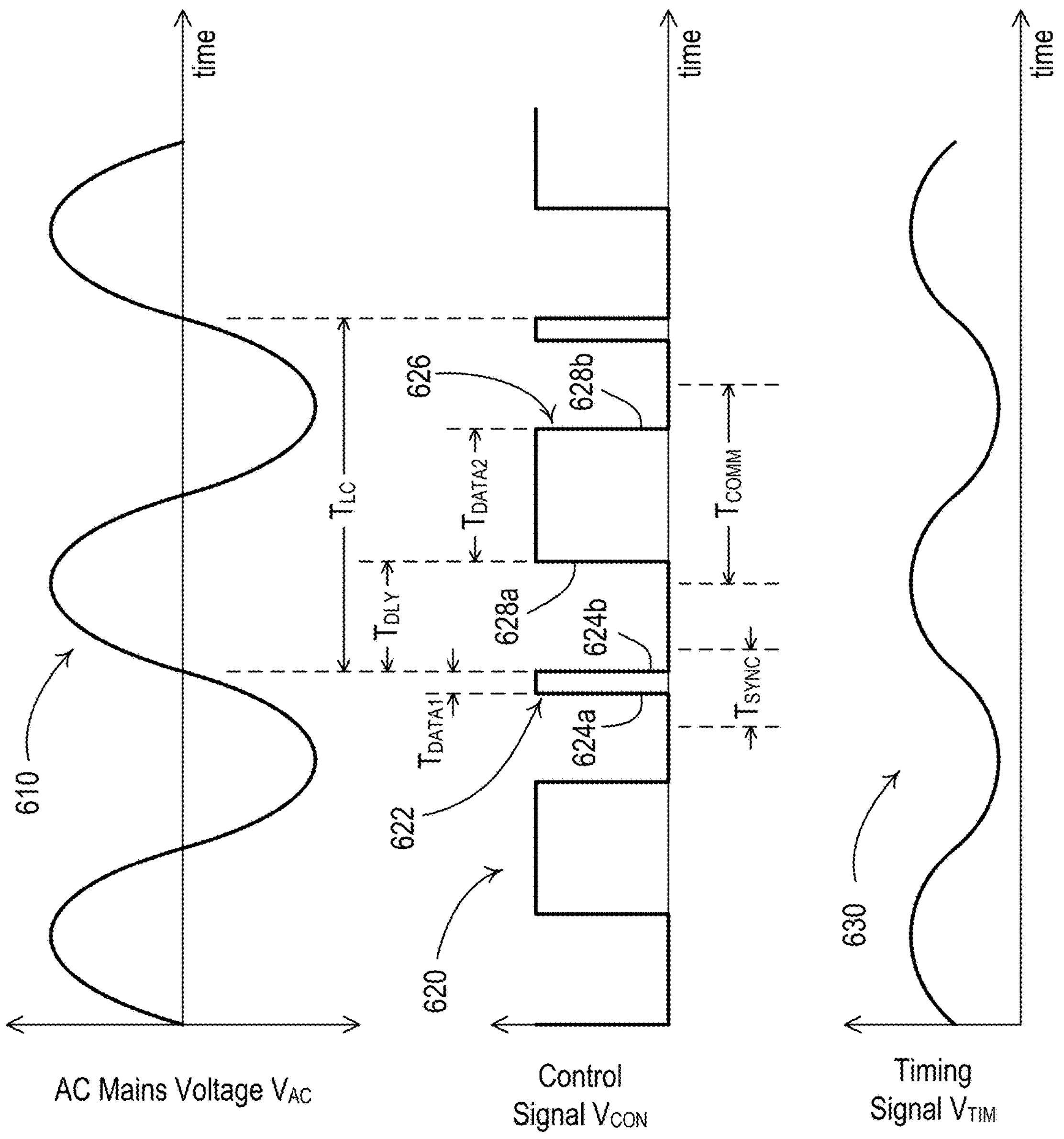
FIGS. 9 and 10 depicts example waveforms associated with the generation of a control signal that is provided to a power supply and/or one or more light-generation modules of a lighting control system for synchronizing the light-generation modules and/or providing for communication between the power supply and the one or more light-generation modules.

FIG. 9 depicts example waveforms associated with the generation of a control signal 620 that is provided to one or more light-generation modules (e.g., the light-generation module 160, 230, light-generation modules of the lighting device assemblies 420*a*, 420*b*, 420*c*, and/or the light-generation module stage 530) of a lighting control system (e.g., the lighting control system 400) for synchronizing the light-generation modules. The lighting control system may also include a power supply (e.g., the power supply 180, the power supply 410, and/or the power conversion stage 520). The power supply and the one or more light-generation modules may be included as part of one or more lighting devices (e.g., the lighting device 100, 500). The power supply may be coupled to the one or more light-generation modules via a bus (e.g., the power-data bus 430), which may comprise three electrical conductors. The bus may include two electrical conductors for supplying a bus voltage to the light-generation modules and single electrical conductor for providing the control signal 620 to the light-generation modules. Each of the light-generation modules may comprise a first control circuit (e.g., the lighting device control circuit 540) configured to receive the control signal 620 and generate a respective timing signal 630, and a second control circuit (e.g., the emitter control circuit 536) configured to receive the timing signal 630 and control an amount of lighting emitted by the light-generation module.

The power supply may receive an AC mains line voltage 610 and may generate the control signal 620. The power supply may be configured to generate a synchronization pulse 622 in the control signal 620, which may indicate a zero-crossing of the AC mains lines voltage 610. The AC mains line voltage 610 may be characterized by a line-cycle period $T_{LC}$ (e.g., approximately 16.6 milliseconds). The synchronization pulse 622 may be characterized by a rising edge 624*a* and a falling edge 624*b*, and may have a time length $T_{DATA1}$ between the rising edge 624*a* and the falling edge 624*b*. The power supply may be configured to determine the zero-crossings of the AC mains line voltage 610 (e.g., in response to the line sync circuit 526) and generate the synchronization pulse 622 in the control signal 620 during a synchronization window $T_{SYNC}$ (e.g., a periodic synchronization window) in each line-cycle of the AC mains lines voltage 610 (e.g., once per line-cycle of the AC mains line voltage 610). For example, the power supply may be configured to generate the falling edge 624*b* of the synchronization pulse 622 at each positive-going zero-crossing of the AC mains line voltage 610. The light-generation modules may be configured to monitor the control signal 610 during the synchronization period $T_{SYNC}$ to detect the synchronization pulse 622. For example, the light-generation modules may each be configured to determine a frequency and/or a phase delay of the AC mains line voltage 610 in response to the falling edges 624*b* of the synchronization pulse 622. Each of the light-generation modules may be configured to generate the timing signal 630 in response to the synchronization pulses 622 of the control signal 620 (e.g., at the same frequency and/or phase delay as the AC mains line voltage 610).

The power supply may be configured to transmit first data to the light-generation modules via the control signal 620. For example, the power supply may be configured to modulate the time length $T_{DATA1}$ of the synchronization pulse to transmit the first data to the light-generation modules. The first data may be, for example, a function of the time length $T_{DATA1}$ of the synchronization pulse 622. For example, the power supply may be configured to transmit an indication of a magnitude of the AC mains lines voltage 610 to the light-generation modules in the first data via the control signal 620. The power supply may be configured to generate the rising edge 624*a* of synchronization pulse 622 at a time relative to the falling edge 624*b* (e.g., at the positive-going zero-crossing of the AC mains line voltage 610) to set the time length $T_{DATA1}$ of the synchronization pulse 622 to encode the first data. For example, the power supply may be configured to generate the rising edge 624*a* of synchronization pulse 622 relative to a previous zero-crossing of the AC mains line voltage 610. The light-generation modules may be configured to monitor the control signal 620 during the synchronization window $T_{SYNC}$ to determine the time length $T_{DATA1}$ of the synchronization pulse 622. For example, the light-generation modules may be configured to detect the rising edge 624*a* and the falling edge 624*b* of the synchronization pulse 622, and calculate the time length $T_{DATA1}$ of the synchronization pulse 622 as the difference between the time of the falling edge 624*b* and the time of the rising edge 624*a*. The light-generation modules may be configured to convert the time length $T_{DATA1}$ of the synchronization pulse 622 into a digital value that may be processed to determine the first data (e.g., to determine the indication of the magnitude of the AC mains lines voltage 610).

Each of the light-generation modules may be configured to transmit second data to the power supply during a communication window $T_{COMM}$ (e.g., a periodic communication window) in each line-cycle of the AC mains line voltage 610. For example, the communication window $T_{COMM}$ may occur once every line-cycle of the AC mains line voltage 610 and may be located outside of the synchronization window $T_{SYNC}$ (e.g., the communication window $T_{COMM}$ does not overlap with the synchronization window $T_{SYNC}$). Each of the light-generation modules may be configured to generate a communication pulse 626 in the control signal 620 during the communication window $T_{COMM}$. The communication pulse 626 may be characterized by a rising edge 628*a* and a falling edge 628*b*, and may have a time length $T_{DATA2}$. When the power supply is coupled to a single light-generation module via the bus, the light-generation module may be configured to transmit second data to the power supply by modulating the time length $T_{DATA2}$ of the communication pulse 626 during the communication window $T_{COMM}$. The light-generation module may begin generating the communication pulse 626 in the control signal 620 after a delay time period $T_{DLY}$ (e.g., approximately 1-2 milliseconds) from the falling edge 624*b* of the synchronization pulse 622 (e.g., an end of the synchronization pulse 622). The second data may each be, for example, a function of the time length $T_{DATA2}$ of the communication pulse 626 and the second time length $T_{DATA2}$ of the second communication pulse 626, respectively. For example, the light-generation module may be configured to transmit an indication of a magnitude of the bus voltage received from the power supply and/or an indication of an amount of power to be drawn from the power supply during a subsequent line-cycle of the AC mains line voltage 610 to the power supply in the second data via the control signal 620. The time length $T_{DATA2}$ of the communication pulse 626 may be a function of the amount of power to be drawn from the power supply during a subsequent line-cycle of the AC mains line voltage 610, such that the time length $T_{DATA2}$ of the communication pulse 626 may increase as the amount of power to be drawn from the power supply during the subsequent line-cycle increases.

The power supply may be configured to monitor the control signal 620 during the communication window $T_{COMM}$ to determine the time length $T_{DATA2}$ of the communication pulse 626. For example, the power supply may be configured to detect the rising edge 628*a* and the falling edge 628*b* of the communication pulse 626, and calculate the time length $T_{DATA2}$ of the communication pulse 626 as the difference between the time of the falling edge 628*b* and the time of the rising edge 628*a*. The power supply may be configured to convert the time length $T_{DATA2}$ of the synchronization pulse 626 into a digital value that may be processed to determine the second data (e.g., to determine the indication of a magnitude of the bus voltage received from the power supply and/or the indication of an amount of power to be drawn from the power supply during a subsequent line-cycle of the AC mains line voltage 610).

When the power supply is coupled to multiple light-generation modules via the bus, each of the light-generation modules may be configured to control the magnitude of the control signal 620 at the same time during the communication window $T_{COMM}$, such that multiple light-generation modules may generate the communication pulse 626 at the same time. Since each of the light-generation modules may have different second data to transmit, each of the light-generation modules may be configured to attempt to control the time length $T_{DATA2}$ of the communication pulse 626 to a different value. As a result, the time length $T_{DATA2}$ of the communication pulse 626 may be set by the light-generation module that controls the magnitude of the control signal 620 for the longest amount of time during the present communication window $T_{COMM}$. The power supply may be configured to monitor the control signal 620 during the communication window $T_{COMM}$ and determine the time length $T_{DATA2}$ of the communication pulse 626 (e.g., as set by the light-generation module that controls the magnitude of the control signal 620 for the longest amount of time during the present communication window $T_{COMM}$). Since the time length $T_{DATA2}$ of the communication pulse 626 may be a function of the amount of power to be drawn from the power supply during a subsequent line-cycle of the AC mains line voltage 610, the light-generation module that controls the magnitude of the control signal 620 for the longest amount of time during the present communication window $T_{COMM}$ may be the light-generation module that anticipates drawing the most amount of power and/or has the largest change in the amount of power to be drawn from the power supply during the subsequent line-cycle.

Figure 10:
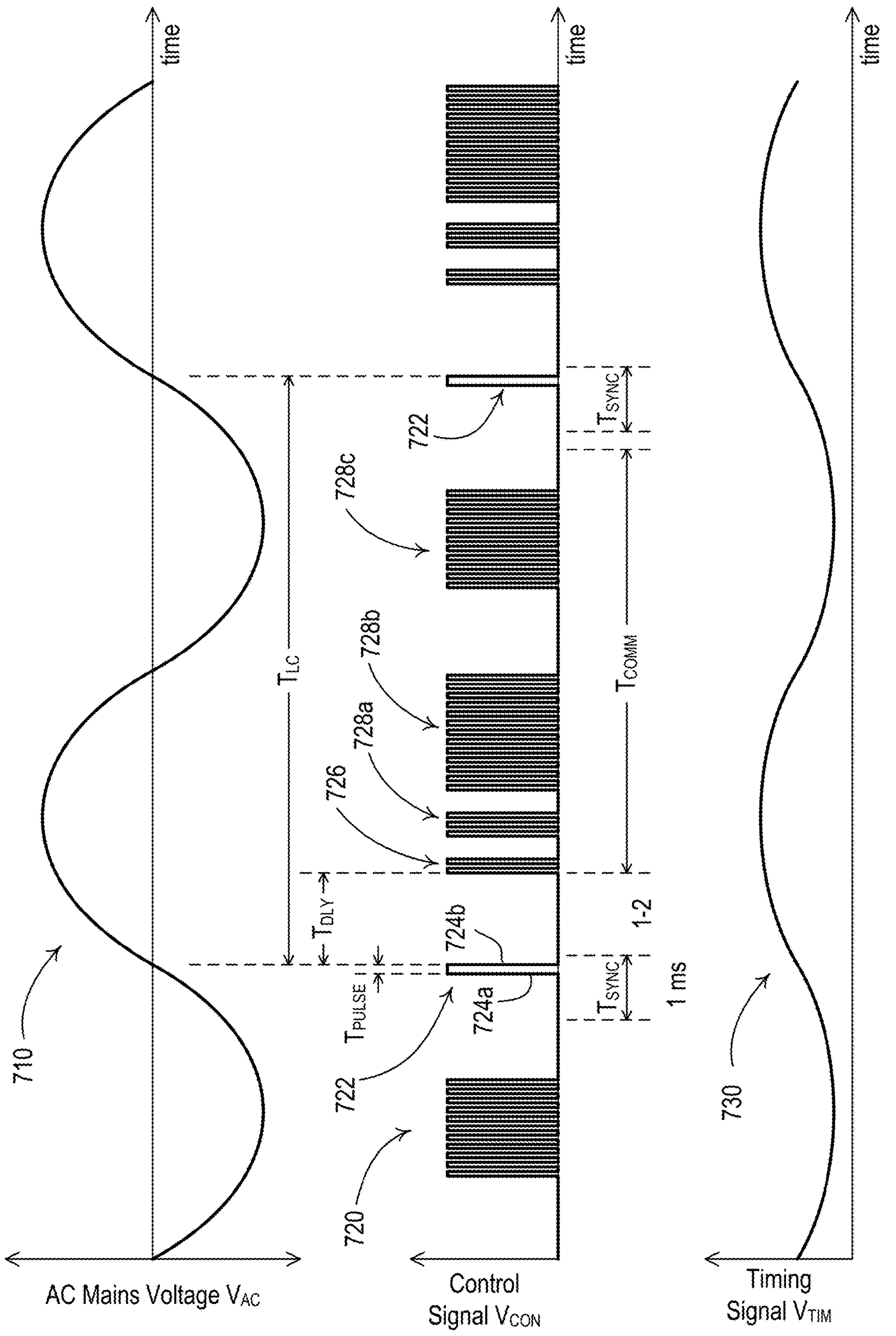

FIG. 10 depicts example waveforms associated with the generation of a control signal 720 that is provided to one or more light-generation modules (e.g., the light-generation module 160, 230, light-generation modules of the lighting device assemblies 420*a*, 420*b*, 420*c*, and/or the light-generation module stage 530) of a lighting control system (e.g., the lighting control system 400) for synchronizing the light-generation modules. The lighting control system may also include a power supply (e.g., the power supply 180, the power supply 410, and/or the power conversion stage 520). The power supply and the one or more light-generation modules may be included as part of one or more lighting devices (e.g., the lighting device 100, 500). The power supply may be coupled to the one or more light-generation modules via a bus (e.g., the power-data bus 430), which may comprise three electrical conductors. The bus may include two electrical conductors for supplying a bus voltage to the light-generation modules and single electrical conductor for providing the control signal 720 to the light-generation modules. Each of the light-generation modules may comprise a first control circuit (e.g., the lighting device control circuit 540) configured to receive the control signal 720 and generate a respective timing signal 730, and a second control circuit (e.g., the emitter control circuit 536) configured to receive the timing signal 730 and control an amount of lighting emitted by the light-generation module.

The power supply may receive an AC mains line voltage 710 and may generate the control signal 720. The power supply may be configured to generate a synchronization pulse 722 in the control signal 720, which may indicate a zero-crossing of the AC mains lines voltage 710. The AC mains line voltage 710 may be characterized by a line-cycle period $T_{LC}$ (e.g., approximately 16.6 milliseconds). The synchronization pulse 722 may be characterized by a rising edge 724*a* and a falling edge 724*b*, and may have a time length $T_{PULSE}$. The power supply may be configured to determine the zero-crossings of the AC mains line voltage 710 (e.g., in response to the line sync circuit 526) and generate the synchronization pulse 722 in the control signal 720 during a synchronization window $T_{SYNC}$ (e.g., a periodic synchronization window) in each line-cycle of the AC mains lines voltage 710 (e.g., once per line-cycle of the AC mains line voltage 710). For example, the power supply may be configured to generate the falling edge 724*b* of the synchronization pulse 722 at each positive-going zero-crossing of the AC mains line voltage 710. The power supply may be configured to generate the rising edge 724*a* of synchronization pulse 722 at a time that is the time length $T_{PULSE}$ before the falling edge 724*b*. For example, the power supply may be configured to generate the rising edge 724*a* of synchronization pulse 722 relative to a previous zero-crossing of the AC mains line voltage 710. The light-generation modules may be configured to monitor the control signal 710 during the synchronization period $T_{SYNC}$ to detect the synchronization pulse 722. For example, the light-generation modules may each be configured to determine a frequency and/or a phase delay of the AC mains line voltage 710 in response to the falling edges 724*b* of the synchronization pulse 722. Each of the light-generation modules may be configured to generate the timing signal 730 in response to the synchronization pulses 722 of the control signal 720 (e.g., at the same frequency and/or phase delay as the AC mains line voltage 710).

At least one of the light-generation modules may be configured to initiate communications between the power supply and the light-generation modules to occur during a communication window $T_{COMM}$ (e.g., a periodic communication window) in each line-cycle of the AC mains line voltage 710. For example, the communication window $T_{COMM}$ may occur once every line-cycle of the AC mains line voltage 710 and may be located outside of the synchronization window $T_{SYNC}$ (e.g., the communication window $T_{COMM}$ does not overlap with the synchronization window $T_{SYNC}$). The at least one of the light-generation modules may be configured to transmit an initial message 726 to the power supply to initiate communications between the power supply and the light-generation modules. The initial message 726 may comprise, for example, a digital message including at least one communication pulse. For example, the initial message 726 may comprise a digital message including a plurality of communication pulses, where digital information is encoded in the plurality of communication pulses. The light-generation module may begin generating the initial message 726 in the control signal 720 after a delay time period $T_{DLY}$ (e.g., approximately 1-2 milliseconds) from the falling edge 724*b* of the synchronization pulse 722 (e.g., an end of the synchronization pulse 722). The initial message 726 may include, for example, a request for the power supply to transmit data to the light-generation modules via the control signal 720 during the communication window $T_{COMM}$. The light-generation module may be configured to encode the request for the power supply to transmit data in the initial message 726. The power supply may be configured to receive and decode the initial message 726 to receive request for the power supply to transmit data.

After receiving the initial message 726, the power supply may be configured to transmit data to the light-generation modules via the control signal 720 during the communication window $T_{COMM}$ during the present the line-cycle of the AC mains line voltage 710. For example, the power supply may be configured to transmit a first data message 728*a* including first data to the light-generation modules during the communication window $T_{COMM}$. The first data message 728*a* may comprise, for example, a digital message including a plurality of communication pulses, where the first data is encoded in the plurality of communication pulses. For example, the power supply may be configured to transmit an indication of a magnitude of the AC mains lines voltage 710 to the light-generation modules in the first data (e.g., the first data message 728*a*) via the control signal 720. The light-generation modules may each be configured to monitor the control signal 720 during the communication window $T_{COMM}$ to receive the first data message 728*a* from the power supply. The light-generation modules may be configured to decode the first data message 728*a* to determine the first data (e.g., to determine the indication of the magnitude of the AC mains lines voltage 710). The power supply is configured to transmit (e.g., quickly transmit) the first data message 728*a* including the first data to the light-generation modules, such that the light-generation modules may use the magnitude of the AC mains lines voltage 710 to control the operation of the respective light-generation modules during the present or next line-cycle.

After transmitting the first data message 728*a*, the power supply may be configured to transmit a status message 728*b* including status information to the light-generation modules during the communication window $T_{COMM}$ during the present the line-cycle of the AC mains line voltage 710. The status message 728*b* may comprise, for example, a digital message including a plurality of communication pulses, where the status information is encoded in the plurality of communication pulses. For example, the power supply may be configured to transmit one or more operational settings and/or characteristics of the power supply in the status information (e.g., the status message 728*b*) via the control signal 720. The light-generation modules may each be configured to monitor the control signal 720 during the communication window $T_{COMM}$ to receive the status message 728*b* from the power supply. The light-generation modules may be configured to decode the status message 728*b* to determine the status information of the power supply. The status information may be larger than the first data and thus may take longer to transmit from the power supply to the light-generation modules (e.g., as shown in FIG. 10). In some examples, the status message 728*b* may be excluded or may be included as part of the first data message 728*a*.

After receiving the status message 728*b*, each of the light-generation modules may be configured to transmit second data to the power supply during the communication window $T_{COMM}$ during the present the line-cycle of the AC mains line voltage 710. When the power supply is coupled to a single light-generation module via the bus, the light-generation module may be configured to transmit, for example, a second data message 728*c* including second data to the power supply during the communication window $T_{COMM}$. The second data message 728*c* may comprise, for example, a digital message including a plurality of communication pulses, where the second data is encoded in the plurality of communication pulses. For example, the light-generation module may be configured to transmit an indication of a magnitude of the bus voltage received from the power supply and/or an indication of an amount of power to be drawn from the power supply during a subsequent line-cycle of the AC mains line voltage 710 in the second data (e.g., the second data message 728*c*) via the control signal 720. The power supply may be configured to monitor the control signal 720 during the communication window $T_{COMM}$ to receive the second data message 728*c* from the light-generation module. The power supply may be configured to decode the second data message 728*c* to determine the data (e.g., to determine the indication of a magnitude of the bus voltage received from the power supply and/or the indication of an amount of power to be drawn from the power supply during a subsequent line-cycle of the AC mains line voltage 710). Although described as a single message, in some instances, any combination of the first data message 728*a*, the status message 728*b*, and/or the second data message 728*c* may comprise multiple messages.

When the power supply is coupled to multiple light-generation modules via the bus, the light-generation modules may be configured to transmit respective second data messages 728*c* including respective second data at different times (e.g., during time periods that do not overlap) during the communication window $T_{COMM}$. In some examples, when the power supply is coupled to multiple light-generation modules via the bus, the light-generation modules may be configured to transmit respective second data messages 728*c* including respective second data during different line-cycles. For example, a first one of the light-generation modules may be configured to transmit a respective second data message 728*c* including respective second data a first line-cycle, and a second one of the light-generation modules may be configured to transmit a respective second data message 728*c* including respective second data a second, subsequent line-cycle (e.g., immediately following the first line-cycle).

Figure 11:
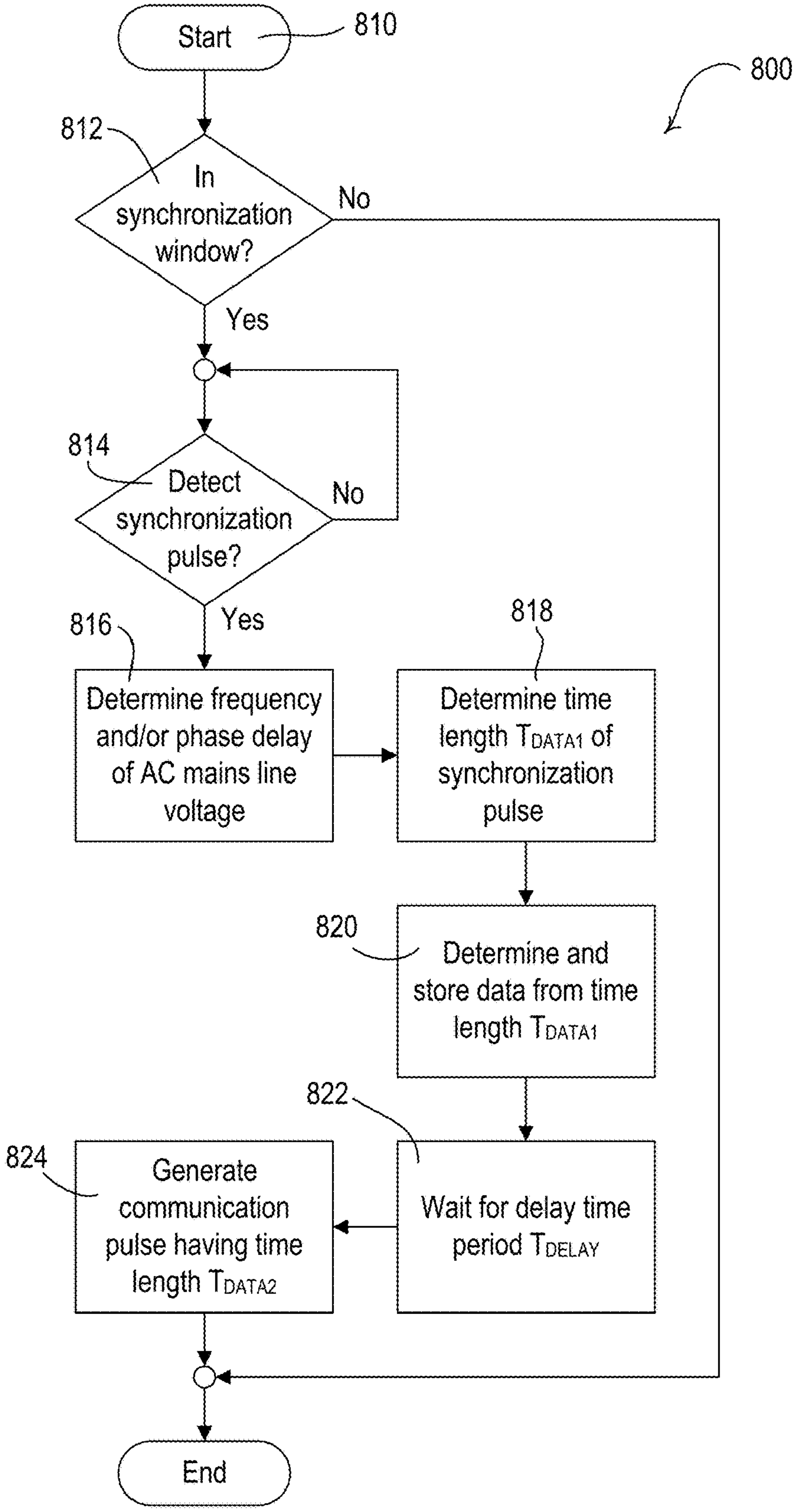
FIGS. 11 and 12 are flowcharts of example procedures for generating a control signal that is provided to a power supply and/or one or more light-generation modules of a lighting control system for synchronizing the light-generation modules and/or providing for communication between the power supply and the one or more light-generation modules.

FIG. 11 is a flowchart of an example procedure 800 for generating a control signal allowing for synchronization and/or communications between a power supply (e.g., the power supply 180, the power supply 410, and/or the power conversion stage 520) and one or more light-generation modules (e.g., the light-generation module 160, 230, light-generation modules of the lighting device assemblies 420*a*, 420*b*, 420*c*, and/or the light-generation module stage 530) of a lighting control system (e.g., the lighting control system 400). For example, the procedure 800 may be executed by a control circuit of at least one of the one or more light-generation modules (e.g., the lighting device control circuit 540 of the light-generation module stage 530 of the lighting device 500). For example, the control circuit may execute the procedure 800 to synchronize with the other light-generation modules of the load control system. The power supply may be coupled to the one or more light-generation modules via a bus (e.g., the power-data bus 430), which may comprise three electrical conductors. The bus may include two electrical conductors for supplying a bus voltage to the light-generation modules and a single electrical conductor for providing the control signal to the light-generation modules. The power supply may be configured to receive an AC mains line voltage for generating the bus voltage.

The control circuit may execute the procedure 800 at 810, for example, periodically (e.g., once every line-cycle of AC mains line voltage). For example, the control circuit may execute the procedure 800 at a beginning of a synchronization window that occurs during each line-cycle of the AC mains line voltage. At 812, the control circuit may determine if the time during the present line-cycle of the AC mains line voltage is during the synchronization window. If not, the procedure 800 may end. If the time during the present line-cycle of the AC mains line voltage is during the synchronization window at 812, the control circuit may determine if a synchronization pulse (e.g., the synchronization pulse 622) has been detected in the control signal at 814. The synchronization pulse may have a rising edge (e.g., the rising edge 624*a*) and a falling edge (e.g., the falling edge 624*b*), and a time length $T_{DATA1}$. For example, the control circuit may determine if a falling edge of the synchronization pulse (e.g., the falling edge 624*b* of the synchronization pulse 622) has been detected at 814. The control circuit may wait at 814 until the synchronization pulse is detected.

When the synchronization pulse is detected at 814, the control circuit may determine at 816 a frequency and/or a phase delay of the AC mains line voltage in response to detecting the synchronization pulse (e.g., in response to determining falling edges of synchronization pulses during consecutive line-cycles). At 818, the control circuit may determine the time length $T_{DATA1}$ of the synchronization pulse. For example, the light-generation modules may be configured to determine a time length $T_{DATA1}$ of the synchronization pulse at 818 by calculating the time length $T_{DATA1}$ of the synchronization pulse as the difference between the time of the falling edge and the time of the rising edge of the synchronization pulse detected at 814. At 820, the control circuit may determine data from the time length $T_{DATA1}$ of the synchronization pulse. For example, the control circuit may be configured to convert the time length $T_{DATA1}$ of the synchronization pulse into a digital value that may be processed to determine the data at 820 (e.g., to determine an indication of the magnitude of the AC mains lines voltage).

At 822, the control circuit may wait for a delay time period $T_{DLY}$ after the synchronization pulse (e.g., after the falling edge of the synchronization pulse). At 824 (e.g., at the end of the delay time period $T_{DLY}$), the control circuit may generate a communication pulse (e.g., the communication pulse 626) in the control signal during a communication window that occurs during each line-cycle of the AC mains line voltage. The control circuit may generate the communication pulse to have a rising edge (e.g., the rising edge 628*a*) and a falling edge (e.g., the falling edge 628*b*), and to have a time length $T_{DATA2}$ between the rising edge 628*a* and the falling edge 628*b*. The control circuit may set the time length $T_{DATA2}$ based on the data to be transmitted to the power supply (e.g., as a function of the data to be transmitted to the power supply). For example, the light-generation module may be configured to transmit an indication of a magnitude of the bus voltage received from the power supply and/or an indication of an amount of power to be drawn from the power supply during a subsequent line-cycle of the AC mains line voltage to the power supply in the data via the control signal.

Figure 12:
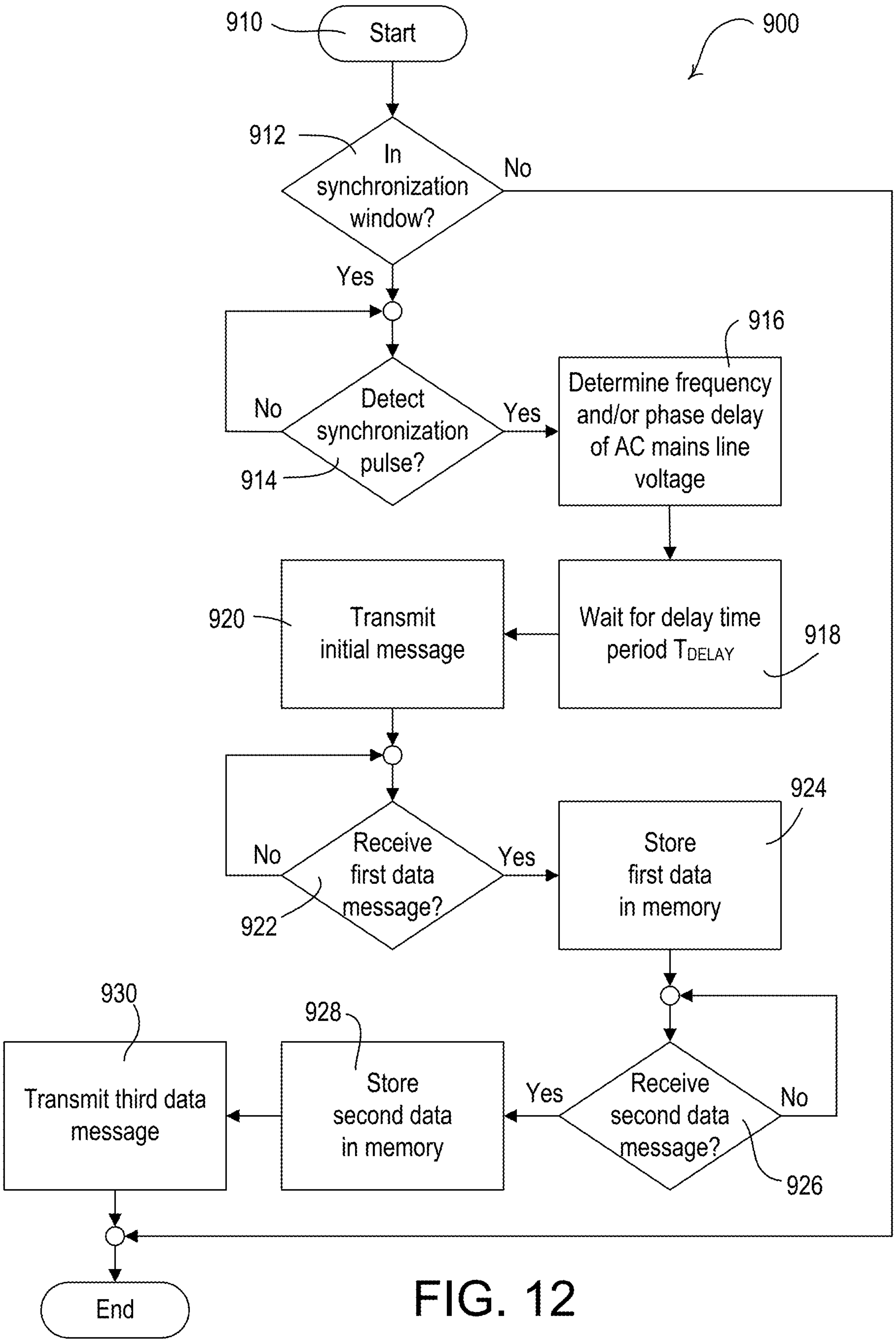

FIG. 12 is a flowchart of an example procedure 900 for generating a control signal allowing for synchronization and/or communications between a power supply (e.g., the power supply 180, the power supply 410, and/or the power conversion stage 520) and one or more light-generation modules (e.g., the light-generation module 160, 230, light-generation modules of the lighting device assemblies 420*a*, 420*b*, 420*c*, and/or the light-generation module stage 530) of a lighting control system (e.g., the lighting control system 400). For example, the procedure 900 may be executed by a control circuit of at least one of the one or more light-generation modules (e.g., the lighting device control circuit 540 of the light-generation module stage 530 of the lighting device 500). For example, the control circuit may execute the procedure 900 to synchronize with the other light-generation modules of the load control system. The power supply may be coupled to the one or more light-generation modules via a bus (e.g., the power-data bus 430), which may comprise three electrical conductors. The bus may include two electrical conductors for supplying a bus voltage to the light-generation modules and a single electrical conductor for providing the control signal to the light-generation modules. The power supply may be configured to receive an AC mains line voltage for generating the bus voltage.

The control circuit may execute the procedure 900 at 910, for example, periodically (e.g., once every line-cycle of AC mains line voltage). For example, the control circuit may execute the procedure 900 at a beginning of a synchronization window that occurs during each line-cycle of the AC mains line voltage. At 912, the control circuit may determine if the time during the present line-cycle of the AC mains line voltage is during the synchronization window. If not, the procedure 900 may end. If the time during the present line-cycle of the AC mains line voltage is during the synchronization window at 912, the control circuit may determine if a synchronization pulse (e.g., the synchronization pulse 622) has been detected in the control signal at 914. The synchronization pulse may have a rising edge (e.g., the rising edge 624*a*) and a falling edge (e.g., the falling edge 624*b*), and a time length $T_{DATA1}$. For example, the control circuit may determine if a falling edge of the synchronization pulse (e.g., the falling edge 624*b* of the synchronization pulse 622) has been detected at 914. The control circuit may wait at 914 until the synchronization pulse is detected.

When the synchronization pulse is detected at 914, the control circuit may determine at 916 a frequency and/or a phase delay of the AC mains line voltage in response to detecting the synchronization pulse (e.g., in response to determining falling edges of synchronization pulses during consecutive line-cycles). At 918, the control circuit may wait for a delay time period $T_{DLY}$ after the synchronization pulse (e.g., after the falling edge of the synchronization pulse). At 920 (e.g., at the end of the delay time period $T_{DLY}$), the control circuit may transmit an initial message (e.g., the initial message 726) to the power supply to initiate communications between the power supply and the light-generation modules. The initial message may comprise, for example, a digital message including at least one communication pulse. For example, the initial message may comprise a digital message including a plurality of communication pulses, where digital information is encoded in the plurality of communication pulses. The initial message may include, for example, a request for the power supply to transmit data to the light-generation modules via the control signal during the communication window. The light-generation module may be configured to encode the request for the power supply to transmit data in the initial message.

At 922, the control circuit may determine whether a first data message (e.g., the first data message 728*a*) has been received from the power supply via the control signal during the communication window. For example, the first data message may comprise a digital message including a plurality of communication pulses, where first data is encoded in the plurality of communication pulses. The control circuit may be configured to monitor the control signal during the communication window at 922 to receive the first data message from the power supply. The control circuit may wait at 922 until the first data message is received. When the first data message is received at 922, the control circuit may store the first data that was received in the first data message in memory at 924. The control circuit may be configured to decode the first data message at 924 to determine the first data, which may indicate the magnitude of the AC mains lines voltage.

At 926, the control circuit may determine whether a status message (e.g., the status message 728*b*) has been received from the power supply via the control signal during the communication window. For example, the status message may comprise a digital message including a plurality of communication pulses, where status information is encoded in the plurality of communication pulses. The control circuit may be configured to monitor the control signal during the communication window at 926 to receive the status message from the power supply. The control circuit may wait at 926 until the status message is received. When the status message is received at 926, the control circuit may store the status information that was received in the status message in memory at 928. The control circuit may be configured to decode the status message at 928 to determine the status information of the power supply.

At 930, the control circuit may transmit a second data message (e.g., the second data message 728*c*) to the power supply via the control signal during the communication window, before the procedure 900 may end. For example, the second data message may comprise a digital message including a plurality of communication pulses, where second data is encoded in the plurality of communication pulses. The control circuit may be configured to encode the second data in the second data message, where the second data may indicate, for example, a magnitude of the bus voltage received from the power supply and/or an amount of power to be drawn from the power supply during a subsequent line-cycle of the AC mains line voltage.

What is claimed is:

1. A light-generation module configured to receive a bus voltage from a power supply, wherein the power supply is configured to generate the bus voltage from an alternating-current (AC) mains line voltage, the light-generation module comprising:

first and second electrical connections configured to receive the bus voltage from the power supply, the bus voltage referenced to a circuit common;

a third electrical connection configured to receive a control signal from the power supply, the control signal referenced to the circuit common;

at least one emitter configured to emit light;

a drive circuit configured to receive the bus voltage and control an amount of current conducted by the at least one emitter; and a control circuit configured to control the drive circuit to adjust the amount of current conducted by the at least one emitter to adjust an amount of light emitted by the light-generation module, the control circuit configured to detect a synchronization pulse in the control signal each line-cycle of the AC mains line voltage, and control the at least one emitter in response to the synchronization pulses;

wherein the control circuit is configured to control the control signal at the third electrical connection to transmit data to the power supply between the synchronizations pulses received in each line-cycle of the AC mains line voltage.

2. The light-generation module of claim 1, wherein the control circuit is configured to control the control signal at the third electrical connection to transmit the data to the power supply by generating at least one communication pulse in the control signal after a delay period from an end of the synchronization pulse during one of the line-cycles of the AC mains line voltage.

3. The light-generation module of claim 2, wherein the at least one communication pulse comprises a single communication pulse and the control circuit is configured to set a time length of the single communication pulse based on the data.

4. The light-generation module of claim 3, wherein the control circuit is configured to transmit, to the power supply via the control signal, an indication of an amount of power to be drawn from the power supply during a subsequent line-cycle of the AC mains line voltage.

5. The light-generation module of claim 4, wherein the control circuit is configured to transmit, to the power supply via the control signal, an indication of a magnitude of the bus voltage.

6. The light-generation module of claim 5, wherein the control circuit is configured to set the time length of the single communication pulse based on both the indication of the amount of power to be drawn from the power supply during a subsequent line-cycle of the AC mains line voltage and the indication of a magnitude of the bus voltage.

7. The light-generation module of claim 4, wherein the indication of the amount of power to be drawn from the power supply during the subsequent line-cycle comprises an indication of a change in the amount of power to be drawn from the power supply during the subsequent line-cycle.

8. The light-generation module of claim 3, wherein the control circuit is configured to generate the single communication pulse during a communication window in each line-cycle of the AC mains line voltage.

9. The light-generation module of claim 8, wherein the control circuit is configured to detect the synchronization pulse by monitoring the control signal during a synchronization window in each line-cycle of the AC mains line voltage, and where the synchronization window does not overlap with the communication window.

10. The light-generation module of claim 2, wherein the at least one communication pulse comprises an initial message including a plurality of communication pulses.

11. The light-generation module of claim 10, wherein the control circuit is configured to encode a request for transmitting data to the light-generation module in the initial message.

12. The light-generation module of claim 11, wherein the control circuit is configured to receive a first data message from the power supply, the control circuit configured to decode the first data message to determine first data that indicates a magnitude of the AC mains line voltage from the power supply.

13. The light-generation module of claim 12, wherein the control circuit is configured to receive a status message from the power supply, the control circuit configured to decode the status message to determine status information of the power supply.

14. The light-generation module of claim 12, wherein the control circuit is configured to transmit a second data message to the power supply, the control circuit configured to encode second data in the second data message, the second data indicating at least one of a magnitude of the bus voltage or an amount of power to be drawn from the power supply during a subsequent line-cycle of the AC mains line voltage and the indication of a magnitude of the bus voltage.

15. The light-generation module of claim 1, wherein the control circuit is configured to determine a frequency of the AC mains line voltage in response to the synchronization pulses of the control signal.

16. The light-generation module of claim 15, wherein the control circuit is configured to generate a timing signal having the frequency of the AC mains line voltage.

17. The light-generation module of claim 16, wherein the control circuit comprises a first control circuit, and the light-generation module further comprises a second control circuit configured to receive the timing signal and control the drive circuit to adjust the amount of current conducted through the at least one emitter in response to the timing signal.

18. The light-generation module of claim 15, wherein the control circuit is configured to determine times of zero-crossings of the AC mains line voltage in response to the synchronization pulses of the control signal.

19. The light-generation module of claim 1, wherein the control circuit is configured to receive data from the power supply in response to a time length of the synchronization pulse.

20. The light-generation module of claim 19, wherein the control circuit is configured to determine an indication of a magnitude of the AC mains line voltage from the power supply in response to the time length of the synchronization pulse, and control the at least one emitter in response to the magnitude of the AC mains line voltage.

* * * * *